(12) United States Patent
Boucké et al.

(10) Patent No.: US 11,242,687 B2
(45) Date of Patent: Feb. 8, 2022

(54) MULTI-PURPOSE TILE SYSTEM

(71) Applicants: I4F Licensing NV, Hamont-Achel (BE); TOWER IPCO Company Limited, Dublin (IE)

(72) Inventors: Eddy Alberic Boucké, Menen (BE); Jincheng Song, Zhangjiagang (CN)

(73) Assignee: I4F Licensing NV, Grebbeweg (NL)

( * ) Notice: Subject to any disclaimer, the term of this patent is extended or adjusted under 35 U.S.C. 154(b) by 0 days.

(21) Appl. No.: 16/610,578

(22) PCT Filed: May 23, 2018

(86) PCT No.: PCT/EP2018/063520
§ 371 (c)(1),
(2) Date: Nov. 4, 2019

(87) PCT Pub. No.: WO2018/215550
PCT Pub. Date: Nov. 29, 2018

(65) Prior Publication Data
US 2020/0063443 A1     Feb. 27, 2020

(30) Foreign Application Priority Data
May 23, 2017   (NL) ..................................... 2018970

(51) Int. Cl.
*E04F 15/02*    (2006.01)
*E04F 15/10*    (2006.01)
*B32B 3/06*     (2006.01)
*B32B 5/18*     (2006.01)

(52) U.S. Cl.
CPC .......... *E04F 15/02038* (2013.01); *B32B 3/06* (2013.01); *B32B 5/18* (2013.01); *E04F 15/105* (2013.01); *E04F 15/107* (2013.01); *B32B 2266/0235* (2013.01); *B32B 2266/08* (2013.01); *B32B 2307/554* (2013.01); *B32B 2419/04* (2013.01); *E04F 2201/0176* (2013.01)

(58) Field of Classification Search
CPC . E04F 15/02038; E04F 15/105; E04F 15/107; E04F 2201/0146
USPC .......................................................... 52/177
See application file for complete search history.

(56) References Cited

U.S. PATENT DOCUMENTS

| | | | | |
|---|---|---|---|---|
| 3,347,048 A | * | 10/1967 | Brown ....................... | E02B 3/14 |
| | | | | 405/16 |
| 3,922,414 A | * | 11/1975 | Oshima .................... | E04C 2/292 |
| | | | | 428/130 |
| 4,037,377 A | * | 7/1977 | Howell ...................... | E04B 1/54 |
| | | | | 52/309.9 |

(Continued)

FOREIGN PATENT DOCUMENTS

| DE | 202016102034 U1 | 6/2016 |
|---|---|---|
| EP | 2647781 A1 | 10/2013 |

(Continued)

*Primary Examiner* — Brian D Mattei
*Assistant Examiner* — Joseph J. Sadlon
(74) *Attorney, Agent, or Firm* — The Webb Law Firm

(57) ABSTRACT

The invention relates to a multi-purpose tile system, in particular a floor tile system, comprising a plurality of multi-purpose tiles. The invention also relates to a tile covering, in particular floor covering, consisting of mutually coupled tiles according to the invention. The invention further relates to a tile for use in multi-purpose tile system according to the invention.

28 Claims, 12 Drawing Sheets

(56) References Cited

U.S. PATENT DOCUMENTS

| | | | |
|---|---|---|---|
| 4,426,820 A | | 1/1984 | Terbrack et al. |
| 5,160,770 A | * | 11/1992 | Hoopengardner ............ A47G 27/0443 428/41.5 |
| 6,647,690 B1 | * | 11/2003 | Martensson ...... E04F 15/02005 52/601 |
| 7,484,337 B2 | * | 2/2009 | Hecht ................. E04F 15/02 52/578 |
| 7,896,571 B1 | * | 3/2011 | Hannig .................. B27F 1/04 403/339 |
| 8,091,238 B2 | * | 1/2012 | Hannig ................. E04F 15/02 29/897.32 |
| 8,745,952 B2 | * | 6/2014 | Perra ..................... E04C 2/38 52/588.1 |
| 8,806,832 B2 | * | 8/2014 | Kell ................ E04F 15/02033 52/588.1 |
| 9,260,870 B2 | * | 2/2016 | Vermeulen ......... E04F 13/0889 |
| 9,695,851 B2 | * | 7/2017 | Hannig ................. F16B 5/008 |
| 9,745,758 B2 | * | 8/2017 | Baert ................ E04F 13/0894 |
| 9,938,727 B2 | * | 4/2018 | Ceysson ............... E04F 15/105 |
| 10,501,945 B2 | * | 12/2019 | Cernohous ............... C08K 3/36 |
| 10,597,876 B2 | * | 3/2020 | Meersseman .......... B32B 27/08 |
| 10,619,358 B2 | * | 4/2020 | Segaert ................ E04F 15/102 |
| 2005/0028474 A1 | * | 2/2005 | Kim ...................... E04F 15/04 52/578 |
| 2007/0234661 A1 | * | 10/2007 | Vaes ..................... E06B 1/006 52/287.1 |
| 2013/0180193 A1 | * | 7/2013 | Bossuyt .................... E04B 1/54 52/309.13 |
| 2013/0309441 A1 | * | 11/2013 | Hannig ................ F16B 5/0056 428/100 |
| 2018/0162086 A1 | * | 6/2018 | Teutsch ................... B32B 5/26 |
| 2019/0017278 A1 | | 1/2019 | De Rick et al. |

FOREIGN PATENT DOCUMENTS

| | | |
|---|---|---|
| EP | 3020885 A1 | 5/2016 |
| EP | 3141674 A1 | 3/2017 |
| WO | 2015130169 A1 | 9/2015 |
| WO | 2016113706 A1 | 7/2016 |
| WO | WO-2017115202 A1 * | 7/2017 ........ E04F 15/02038 |

\* cited by examiner

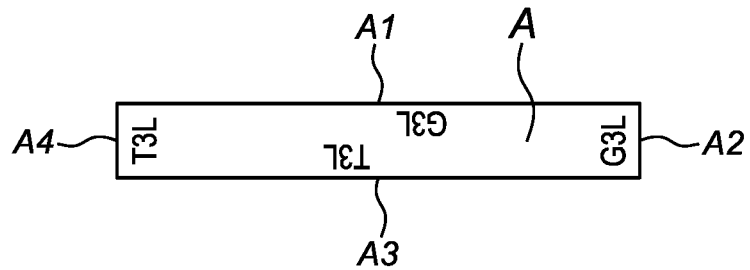
Fig. 7a
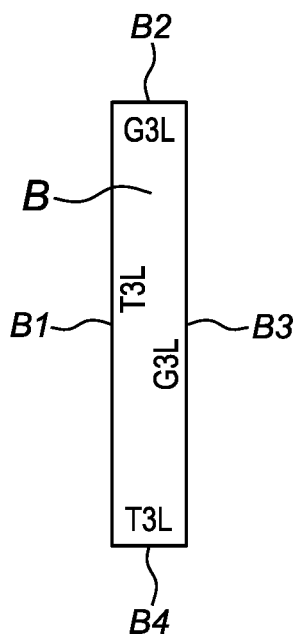 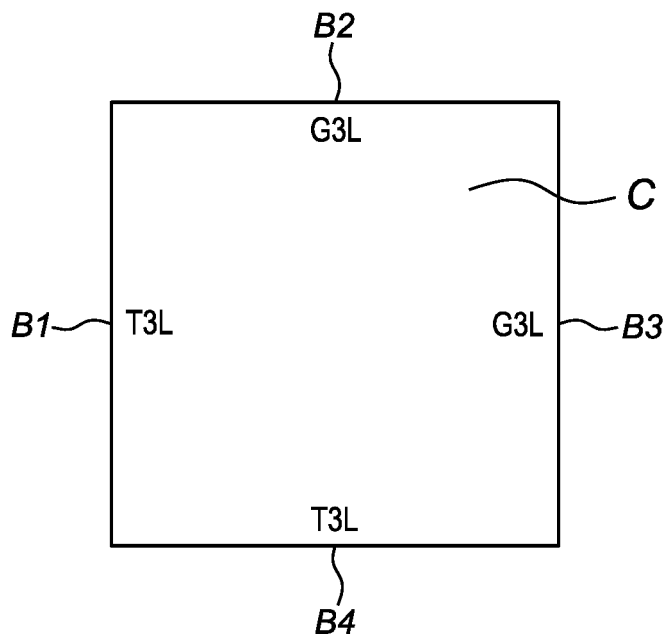
Fig. 7b  Fig. 7c

*Fig. 7g*

MULTI-PURPOSE TILE SYSTEM

CROSS-REFERENCE TO RELATED APPLICATIONS

This application is the United States national phase of International Application No. PCT/EP2018/063520 filed May 23, 2018, and claims priority to Dutch Patent Application No. 2018970 filed May 23, 2017, the disclosures of which are hereby incorporated by reference in their entirety.

BACKGROUND OF THE INVENTION

Field of the Invention

The invention relates to a multi-purpose tile system, in particular a floor tile system, comprising a plurality of multi-purpose tiles. The invention also relates to a tile covering, in particular floor covering, consisting of mutually coupled tiles according to the invention. The invention further relates to a tile for use in multi-purpose tile system according to the invention.

Description of the Related Art

Interconnectable tiles or panels, such as interconnectable floor panels, are generally joined mechanically at edges of the panels by using complementary coupling profiles at opposite edges. Traditionally, rectangular floor panels are connected at the long edges by means of a traditional angling method. On the short side, the different coupling mechanisms can be applied, wherein a short edge coupling mechanism may, for example, be based upon vertical folding, also referred to as a drop down, wherein a downward tongue located at a short edge of a panel to be coupled is moved in downward direction, such that said downward tongue is inserted into an upward groove located at a short edge of a panel already installed. An example of such a panel is disclosed in U.S. Pat. No. 7,896,571, wherein a short edge coupling mechanism is shown being configured to vertically lock mutually coupled short edges of adjacent panels. Although this aimed vertical locking effect at the short edges is intended to stabilize the coupling between floor panels at the short edges, in practice often breakages, due to coupling edges being put under tension both during assembly and during practical use, occur at the coupling edges, which affects the reliability and durability of this type of drop down coupling.

A first objective of the invention is to provide an improved panel which can be coupled in improved manner to an adjacent panel.

A second objective of the invention is to provide an improved panel comprising an improved, in particular relatively reliable, drop down coupling mechanism.

A third objective of the invention is to provide an improved panel comprising an improved drop down coupling mechanism, wherein the risk of damaging, in particular breakage of, the drop down coupling mechanism is reduced.

A fourth objective of the invention is to provide an improved panel comprising an improved drop down coupling mechanism, wherein the risk of damaging, in particular breakage of, the drop down coupling mechanism during both coupling and uncoupling is reduced.

SUMMARY OF THE INVENTION

In order to achieve at least one of the above objects, the invention provides a tile wherein a rigid closed cell foam plastic material used in a base layer provides the tile as such a desired rigidity and robustness preventing damaging, and in particular breakage, of the coupling parts (during normal use). An additional advantage of using a foam plastic material is that the presence closed cells not only leads to improved rigidity and improved impact resistance, but also to reduced density and lighter weight in comparison with dimensionally similar non-foam plastic material. The rigidity of the base layer is further improved by applying a toughening agent, wherein the base layer of closed cell foam plastic material contains, 3% to 9% by weight of the toughening agent. Because the coupling parts are given a specific form, the substantially complementarily formed coupling parts of adjacent tiles can be coupled to each other relatively simply, but durably and efficiently. During coupling of adjacent tiles a force will here be exerted on one or both coupling parts, whereby the one or both coupling parts will slightly and temporarily (resiliently) deform to some extent, as a consequence of which the volume taken up by the downward groove and/or upward groove will be increased such that the upward tongue and the downward tongue can be arranged relatively simply in respectively the downward groove and the upward groove. By subsequently allowing the forced coupling parts to move back (resiliently) to the original position a reliable, locked coupling will be realized between the two coupling parts, and thereby between the two tiles. Hence, the first coupling part may be considered as resilient first coupling part. The second coupling part may be considered as resilient second coupling part. Due to the rigidity of the base layer, and due to the fact that the at least a part of the coupling parts will typically be integrated with said base layer (at least in some embodiments), the resiliency of the coupling parts will be commonly be very restricted though sufficient to allow tiles to be coupled and uncoupled. This locked coupling, wherein both coupling parts mutually engage in relatively reliable manner, and which commonly results in a locking effect between two tiles both in horizontal direction and in vertical direction, will preferably be without play, which counteracts the risk of the occurrence of creaking noises. Hereby, it is aspired to reduce this risk by a suitable design of the profiles of the coupling parts, such that the risk of said undesired noises is reduced even if no sliding agent is applied, which, however, does not exclude that a sliding agent still can be applied on the coupling parts of the tiles according to the invention. The design of the coupling parts of the tiles, together with the rigidity of the panel, allows tiles to be coupled to an already installed tile by means of a mutual linear displacement in vertical direction (i.e. a direction perpendicular to a plane defined by said already installed tile) and/or by means of a zipping action (scissoring action). Hence, the design of the coupling parts of the tiles, together with the rigidity of the panel, leads to a system of multi-purpose tiles which can be installed in an user-friendly and durable and reliable manner. Moreover, the design of the coupling parts of the tiles, together with the rigidity of the panel, allows coupled multi-purpose tiles to be uncoupled without breaking the tiles, after which the tiles can be reused. The applied aligning edges, generally also referred to as chamferings or guide surfaces, herein facilitate hooking together of the two coupling parts by the substantially linear displacement of the coupling parts relative to each other. Because both the (optional) first locking element and the (optional) second locking element are integrally part of the respectively the upward tongue and the downward flank, the vertical (and rotational (angular) locking effect between coupled panels can be improved. At least a part of the coupling parts typically make integral part of the base layer, and are therefore made of the same material as the base layer (closed cell foam plastic material). The characteristic orientation of the side of the upward tongue facing toward the upward flank, and the side of the downward tongue facing toward the downward flank, provides for a locking effect between coupled tiles both in horizontal vertical (parallel to the plane defined by the tiles) and in vertical direction (perpendicular to the plane defined by the tiles). This is because, owing to the characteristic inclining orientation of the tongue walls facing toward the respective flanks, the exerting of (for instance) a vertical force on the coupling will merely lead to uncoupling of co-acting coupling parts after a serious vertical force (perpendicular to the plane defined by the tiles) is exerted on the second coupling part, in a direction away from the first coupling part, which can be established, for example, by using a specific uncoupling tool typically provided with a suction cup. The serious forces exerted to the tile(s) can be absorbed by the tile due to the application of the rigid core layer at least partially made of closed cell plastic foam. In addition to aforementioned inner locking mechanism, an outer locking mechanism is preferably formed by the locking elements which co-act mutually, and furthermore at a distance from the above mentioned (inner) tongue walls, in a coupled position of two tiles. The combination of said inner locking mechanism and said outer locking mechanism, positioned at a distance from said inner locking mechanism, also leads to a locking effect in rotational direction which counteracts the tiles in coupled condition to mutually pivot. Moreover, in case of possible failure of one of the locking mechanisms, securing of the coupling between the two tiles will be maintained as far as possible, this resulting in a relatively reliable coupling between the two tiles, whereby undesirable mutual displacement or uncoupling of the tiles can still be prevented as far as possible.

The tile according to the invention is a light-weight multi-purpose tile that can be used, for example, as a ceiling tile, a wall tile a floor tile, or as component of a piece of furniture. The tile can be directly bonded to a ceiling, wall or floor surface. The tile can also be used as a ceiling tile in a suspended or hung ceiling assembly having grid sections that support the tile. When used as a wall covering, the tile can be folded to continuously fit within an inside corner of intersecting walls or wrap around an outside corner. When used as a floor covering, the tile can be installed with other similar tiles in a floating floor assembly, wherein the tiles are not bonded directly to a floor base. The multi-purpose tile is relatively inexpensive to manufacture and does not require special skills or training to handle and install, making it attractive for do-it-yourself individuals who have had no previous experience installing tiles. Due to the waterproof properties of the base layer, and preferably of the tiles as such, the tiles may be used both indoor and outdoor. The tiles according to the invention may also be referred to as panels. The base layer may also be referred to as core layer. The coupling parts may also be referred to as coupling profiles.

Foam plastic materials suitable for forming the foam base layer may include polyurethane, polyamide copolymers, polystyrene, polyvinyl chloride (PVC), polypropylene and polyethylene foamed plastics, all of which have good moulding processability. Polyvinyl chloride (PVC) foam materials are especially suitable for forming the foam base layer because they are chemically stable, corrosion resistant, and have excellent flame-retardant properties. Preferably, chlorinated PVC (CPVC) and/or chlorinated polyethylene (CPE) and/or another chlorinated thermoplastic material is/are used to further improve the hardness and rigidity of the base layers, and of the tiles as such. The plastic material used in as foam plastic material in the base layer is preferably free of any plasticizer in order to increase the desired rigidity of the base layer, which is, moreover, also favourable from an environmental point of view. Foam plastic materials according to the invention also include foamed plastic composites and foamed composites including plastic materials. The substantially rigid base layer of each tile may thus be at least partially composed of a composite comprising a closed cell foam plastic material and at least one filler. Conventional materials, like HDF and MDF, are weaker than the aforementioned foamed composite, and will easily lead to breakage and/or damaging. The composite of the base layer may thus comprise one or more fillers, wherein at least one filler is selected from the group consisting of: talc, chalk, wood, calcium carbonate, titanium dioxide, calcined clay, porcelain, a(nother) mineral filler, and a(nother) natural filler. The filler may be formed by fibres and/or may be formed by dust-like particles. Here, the expression "dust" is understood as small dust-like particles (powder), like wood dust, cork dust, or non-wood dust, like mineral dust, stone powder, in particular cement. The average particle size of the dust is preferably between 14 and 20 micron, more preferably between 16 and 18 micron. The weight content of this kind of filler in the composite is preferably between 35 and 75%, more preferably between 40 and 48% in case the composite is a foamed composite, and more preferably between 65 and 70% in case the composite is a non-foamed (solid) composite. The filler of the base layer may for instance be selected from the group consisting of: a salt, a stearate salt, calcium stearate, and zinc stearate. Stearates have the function of a stabilizer, and lead to a more beneficial processing temperature, and counteract decomposition of components of the composite during processing and after processing, which therefore provide long-term stability. Instead of or in addition to a stearate, for example calcium zinc may also be used as stabilizer. The weight content of the stabilizer(s) in the composite will preferably be between 1 and 5%, and more preferably between 1.5 and 4%.

The base layer, or the composite of the base layer preferably comprises at least one impact modifier comprising at least one alkyl methacrylates, wherein said alkyl methacrylate is preferably chosen from the group consisting of: methyl methacrylate, ethyl methacrylate, propyl methacrylate, isopropyl methacrylate, t-butyl methacrylate and isobutyl methacrylate. The impact modifier typically improves the product performance, in particular the impact resistance. Moreover, the impact modifier typically toughens the base layer and can therefore also be seen as toughening agent, which further reduces the risk of breakage. Often, the modifier also facilitates the production process, for example, in order to control the formation of the foam with a relatively consistent (constant) foam structure. The weight content of the impact modifier in the composite will preferably be between 1 and 9%, and more preferably between 3 and 6%.

The base layer may also at least partially be composed of a (PVC-free) thermoplastic composition. This thermoplastic composition may comprise a polymer matrix comprising (a) at least one ionomer and/or at least one acid copolymer; and (b) at least one styrenic thermoplastic polymer, and, optionally, at least one filler. An ionomer is understood as being a copolymer that comprises repeat units of electrically neutral and ionized units. Ionized units of ionomers may be in particular carboxylic acid groups that are partially neutralized with metal cations. Ionic groups, usually present in low amounts (typically less than 15 mol % of constitutional units), cause micro-phase separation of ionic domains from the continuous polymer phase and act as physical crosslinks. The result is an ionically strengthened thermoplastic with enhanced physical properties compared to conventional plastics.

The density of the foam base layer typically varies from about 0.1 to 1.5 grams/cm$^3$, preferably from about 0.2 to 1.4 grams/cm$^3$, more preferably from about 0.3 to 1.3 grams/cm$^3$, even more preferably from about 0.4 to 1.2 grams/cm$^3$, even more preferably from about 0.5 to 1.2 grams/cm$^3$, and most preferably from about 0.6 to 1.2 grams/cm$^3$.

Preferably, the base layer comprises at least one foaming agent. The at least one foaming agent takes care of foaming of the base layer, which will reduce the density of the base layer. This will lead to light weight tiles, which are lighter weight in comparison with tile which are dimensionally similar and which have a non-foamed base layer. The preferred foaming agent depends on the (thermo)plastic material used in the base layer, as well as on the desired foam ratio, foam structure, and preferably also the desired (or required) foam temperature to realise the desired foam ratio and/or foam structure. To this end, it may be advantageous to apply a plurality of foaming agents configured to foam the base layer at different temperatures, respectively. This will allow the foamed base layer to be realized in a more gradual, and more controller manner. Examples of two different foaming agents which may be present (simultaneously) in the base layer are azidicarbonamide and sodium bicarbonate. In this respect, it is often also advantageous to apply at least one modifying agent, such as methyl methacrylate (MMA), in order to keep the foam structure relatively consistent throughout the base layer.

Each tile preferably comprises an upper substrate affixed to an upper side the base layer, wherein said substrate preferably comprises a decorative layer. The upper substrate is preferably at least partially made of at least one material selected from the group consisting of: metals, alloys, macromolecular materials such as vinyl monomer copolymers and/or homopolymers; condensation polymers such as polyesters, polyamides, polyimides, epoxy resins, phenol-formaldehyde resins, urea formaldehyde resins; natural macromolecular materials or modified derivatives thereof such as plant fibres, animal fibres, mineral fibres, ceramic fibres and carbon fibres. Here, the vinyl monomer copolymers and/or homo-polymers are preferably selected from the group consisting of polyethylene, polyvinyl chloride (PVC), polystyrene, polymethacrylates, polyacrylates, polyacrylamides, ABS, (acrylonitrile-butadiene-styrene) copolymers, polypropylene, ethylene-propylene copolymers, polyvinylidene chloride, polytetrafluoroethylene, polyvinylidene fluoride, hexafluoropropene, and styrene-maleic anhydride copolymers, and derivates thereof. The upper substrate most preferably comprises polyethylene or polyvinyl chloride (PVC). The polyethylene can be low density polyethylene, medium density polyethylene, high density polyethylene or ultra-high density polyethylene. The upper substrate layer can also include filler materials and other additives that improve the physical properties and/or chemical properties and/or the processability of the product. These additives include known toughening agents, plasticizing agents, reinforcing agents, anti-mildew (antiseptic) agents, flame-retardant agents, and the like. The upper substrate typically comprises a decorative layer and an abrasion resistant wear layer covering said decorative layer, wherein a top surface of said wear layer is the top surface of said tile, and wherein the wear layer is a transparent material, such that decorative layer is visible through the transparent wear layer.

The thickness of the upper substrate typically varies from about 0.1 to 2 mm, preferably from about 0.15 to 1.8 mm, more preferably from about 0.2 to 1.5 mm, and most preferably from about 0.3 to 1.5 mm. The thickness ratio of the foam base layer to the upper substrate commonly varies from about 1 to 15:0.1 to 2, preferably from about 1.5 to 10:0.1 to 1.5, more preferably from about 1.5 to 8:0.2 to 1.5, and most preferably from about 2 to 8:0.3 to 1.5, respectively.

Each tile may comprise an adhesive layer to affix the upper substrate, directly or indirectly, onto the base layer. The adhesive layer can be any well-known bonding agent or binder capable of bonding together the upper substrate and the foam base layer, for example polyurethanes, epoxy resins, polyacrylates, ethylene-vinyl acetate copolymers, ethylene-acrylic acid copolymers, and the like. Preferably, the adhesive layer is a hot-melt bonding agent.

The decorative layer or design layer, which may be part of the upper substrate as mentioned above, can comprise any suitable known plastic material such as a known formulation of PVC resin, stabilizer, plasticizer and other additives that are well known in the art. The design layer can be formed with or printed with printed patterns, such as wood grains, metal or stone design and fibrous patterns or three-dimensional figures. Thus the design layer can provide the tile with a three dimensional appearance that resembles heavier products such as granite, stone or metal. The thickness of the design layer typically varies from about 0.01 to 0, 1 mm, preferably from about 0.015 to 0.08 mm, more preferably from about 0.2 to 0.7 mm, and most preferably from about 0.02 to 0.5 mm. The wear layer that typically forms the upper surface of the tile can comprise any suitable known abrasion-resistant material, such as an abrasion-resistant macromolecular material coated onto the layer beneath it, or a known ceramic bead coating. If the wear layer is furnished in layer form, it can be bonded to the layer beneath it. The wear layer can also comprise an organic polymer layer and/or inorganic material layer, such as an ultraviolet coating or a combination of another organic polymer layer and an ultraviolet coating. For example, an ultraviolet paint capable of improving the surface scratch resistance, glossiness, antimicrobial resistance and other properties of the product. Other organic polymers including polyvinyl chloride resins or other polymers such as vinyl resins, and a suitable amount of plasticizing agent and other processing additives can be included, as needed. The decorative layer or design layer may also be digitally printed directly onto the core layer.

The plastic foam used in the base layer preferably has an elastic modulus of more than 700 MPa (at a temperature of 23 degrees Celsius and a relative humidity of 50%). This will commonly sufficiently rigidity to the base layer, and hence to the tile as such.

The density of the base layer preferably varies along the height of the base layer. This may positively influence the acoustic (sound-dampening) properties of the tiles as such. Preferably, at a top section and/or a bottom section of the foamed base layer a crust layer may be formed. This at least one crust layer may form integral part of the base layer. More preferably, both the top section and the bottom section of the base layer form a crust layer enclosing the foam structure. The crust layer is a relatively closed (reduced porosity, preferably free of bubbles (cells)), and hence forms a relatively rigid (sub)layer, compared to the more porous foam structure. Commonly, though not necessary, the crust layer is formed by sealing (searing) the bottom and top surface of the core layer. Preferably the thickness of each crust layer is between 0.01 and 1 mm, preferably between 0.1 and 0.8 mm. Too thick crust will lead to a higher average density of the core layer which increases both the costs and the rigidity of the core layer. The thickness of the core layer as such is preferably between 2 and 10 mm, more preferably between 3 and 8 mm.

Preferably, each tile comprises at least one backing layer affixed to a bottom side of the base layer, wherein said at least one backing layer at least partially made of a flexible material, preferably an elastomer. The thickness of the back layer is typically at least 0.1 mm and smaller than 5 mm, and more typically is smaller than 2.5 mm. The backing layer commonly provides additional robustness and impact resistances to each tile as such, which increases the durability of the tiles.

Moreover, the (flexible) backing layer may increase the acoustic (sound-dampening) properties of the tiles. In a particular embodiment, the base layer is composed of a plurality of separate base layer segments affixed to said at least one backing layer, preferably such that said base layer segments are mutually hingeable. The lightweight features of the tiles are advantageous for obtaining a secure bond when installing the tile on vertical wall surfaces. It is also especially easy to install the tile at vertical corners, such as at inside corners of intersecting walls, pieces of furniture, and at outside corners, such as at entry ways. An inside or outside corner installation is accomplished by forming a groove in the foam base layer of the tile to facilitate bending or folding of the tile.

At least one reinforcing layer may be situated in between the base layer and the upper substrate. This may lead to further improvement of the rigidity of the tiles as such. This may also lead to improvement of the acoustic (sound-dampening) properties of the tiles. The reinforcement layer may comprise a woven or non-woven fibre material, for example a glass fibre material. They may have a thickness of 0.2-0.4 mm. It is also conceivable that each tile comprises a plurality of the (commonly thinner) base layer stacked on top of each other, wherein at least one reinforcing layer is situated in between two adjacent base layers.

During coupling and uncoupling the coupling parts will commonly be inclined to deform at or in their weakest section. To this end, at least one coupling part of the first coupling part and second coupling part preferably comprises a bridge connecting the tongue of said coupling element to the base layer, wherein the minimum thickness of the bridge is smaller than the minimum width of the tongue. This will force the bridge(s) rather than the tongue itself to be slightly deformed during coupling and uncoupling, which is commonly in favour of the durability (and shape stability) of the tongues, and hence of the durability and reliability of the coupling realized between two panels.

A lower side (lower surface) of an upper bridge of the second coupling part defining an upper side (upper surface) of the downward groove may be at least partially inclined, and preferably extends downward towards the core of the panel. The upper side (upper surface) of the upward tongue may, as well, be at least partially inclined, wherein the inclination of this upper side of the upward tongue and the inclination of the upper bridge of the second coupling part may be identical, though wherein it is also imaginable that both inclinations for instance mutually enclose an angle between 0 and 5 degrees. The inclination of the bridge part of the second coupling part creates a natural weakened area of the bridge part, where deformation is likely to occur.

Each of the upward tongue and the downward tongue is preferably substantially rigid, which means that the tongues are not configured to be subjected to deformation. The tongues as such are relatively stiff and hence non-flexible. Moreover, the tongues are preferably substantially solid, which means that the tongues are substantially massive and thus completely filled with material and are therefore not provided with grooves at an upper surface which would weaken the construction of the tongue and hence of the tile connection to be realised. By applying a rigid, solid tongue a relatively firm and durable tongue is obtained by means of which a reliable and the durable tile connection can be realised without using separate, additional components to realise a durable connection.

In an embodiment of the tile, at least a part of the upward flank adjoining the upper side of the tile is adapted to make contact with at least a part of the downward tongue adjoining the upper side of another tile in a coupled state of these tiles. Engagement of these surfaces will lead to an increase of the effective contact surface between the coupling parts and hence to an increase of stability and sturdiness of the connection between two tiles. In a favourable embodiment the upper side of the tile is adapted to engage substantially seamless to the upper side of another tile, as a result of which a seamless connection between two tiles, and in particular the upper surfaces thereof, can be realised.

In another embodiment the first locking element is positioned at a distance from an upper side of the upward tongue. This is favourable, since this will commonly result in the situation that the first locking element is positioned at a lower level than the upward aligning edge of the tile, which has the advantage that the maximum deformation of the second coupling part can be reduced, whereas the connection process and deformation process can be executed in successive steps. Less deformation leads to less material stress which is in favour of the life span of the coupling part(s) and hence of the tile(s). In this embodiment the second locking element is complementary positioned at a distance from an upper side of the downward groove.

In yet another embodiment the effective height of the downward aligned edge is larger than the effective height of the upward tongue. This commonly results in the situation that the downward aligning edge of a tile does not engage another tile in case of a pre-aligned state (intermediate state), as shown e.g. in FIG. 18. The position-selective contactless pre-alignment does prevent or counteract forcing the downward aligning edge of a tile along the upper surface of another tile, which could damage the tiles.

In an embodiment the mutual angle enclosed by at least a part of a side of the upward tongue facing toward the upward flank and the upward flank (and/or the normal of the upper side of the base layer) is substantially equal to the mutual angle enclosed by at least a part of a side of the downward tongue facing toward the downward flank and the downward flank (and/or the normal of the lower side of the base layer). A close-fitting connection of the two tongue parts to each other can hereby be realized, this generally enhancing the firmness of the coupling between the two tiles. In an embodiment variant the angle enclosed by on the one hand the direction in which at least a part of a side of the upward tongue facing toward the upward flank extends and on the other the upward flank and/or the normal of the upper side of the base layer lies between 0 and 60 degrees, in particular between 0 and 45 degrees, more particularly between 0 and 10 degrees. In another embodiment variant the angle enclosed by on the one hand the direction in which at least a part of a side of the downward tongue facing toward the downward flank extends and on the other hand the downward flank and/or the normal of the lower side of the base layer lies between 0 and 60 degrees, in particular between 0 and 45 degrees, more particularly between 0 and 10 degrees. The eventual inclination of the tongue side facing toward the flank usually also depends on the production means applied to manufacture the tile. In an embodiment inclination of the downward aligned edge is less than the inclination of at least an upper part of the upward flank, as result of which an expansion chamber will be formed between both surface which will be favourable to allow play and to compensate expansion, e.g. due to moist absorption by the tiles.

In a variant at least a part of an upper side of the upward tongue extends in a direction toward the normal of the upper side of the base layer. This has the result that the thickness of the upward tongue decreases in the direction of the side of the tongue facing away from the upward flank. By having the downward groove substantially connect to the upper side of the upward tongue, in a coupled position of two tiles according to the invention wherein an upper side of the downward groove extends in the direction of the normal of the lower side of the base layer, a second coupling part can be provided which is on the one hand relatively strong and solid and can on the other guarantee sufficient resilience to enable a coupling to be realized to a first coupling part of an adjacent tile.

The aligning edges are preferably formed by a flat surface so as to allow guiding of another coupling part during the process of coupling two tiles to proceed be generally in as controlled a manner as possible. Application of a rounded aligning edge is, however, also imaginable. In another embodiment variant at least a part of the aligning edge of the second coupling part has a substantially flatter orientation than at least a part of the upward flank of the first coupling part. By applying this measure there is generally created in a coupled position an air gap between the aligning edge of the second coupling part and a flank of the first coupling part. This clearance intentionally created between the two coupling parts is usually advantageous during coupling of adjacent tiles, since this clearance does not prevent a temporary deformation of the coupling parts, this facilitating coupling of the coupling parts. Furthermore, the created clearance is advantageous for the purpose of absorbing expansion of the tile, for instance resulting from environmental temperature changes.

In an embodiment variant a part of the upward flank of the first coupling part connecting to the base layer forms a stop surface for at least a part of the side of the downward tongue facing away from the downward flank. In this way a close fitting of at least the upper side of the tiles can be realized, this usually being advantageous from a user viewpoint. A part of the upward flank of the first coupling part connecting to the base layer is here preferably oriented substantially vertically. At least a part of the side of the downward tongue facing away from the downward flank is here also preferably oriented substantially vertically. Applying substantially vertical stop surfaces in both coupling parts has the advantage that in the coupled position the coupling parts can connect to each other in relatively close-fitting and firm manner.

It is generally advantageous for the upward groove to be adapted to receive with clamping fit a downward tongue of an adjacent tile. Receiving the upward groove, or at least a part thereof, with clamping fit in the downward tongue has the advantage that the downward tongue is enclosed relatively close-fittingly by the upward groove, this usually enhancing the firmness of the coupled construction. The same applies for the embodiment variant in which the downward groove is adapted to receive with clamping fit an upward tongue of an adjacent tile.

In an embodiment variant the upward flank and the downward flank extend in a substantially parallel direction. This makes it possible to connect the flanks, as well as the locking elements, relatively closely to each other in a coupled position, this generally enhancing the locking effect realized by the locking elements.

In another embodiment variant the first locking element, if applied, comprises at least one outward bulge, and the second locking element, if applied, comprises at least one recess, which outward bulge is adapted to be at least partially received in a recess of an adjacent coupled tile for the purpose of realizing a locked coupling. This embodiment variant is generally advantageous from a production engineering viewpoint. The first locking element and the second locking element preferably take a complementary form, whereby a form-fitting connection of the locking elements of adjacent tiles to each other will be realized, this enhancing the effectiveness of the locking. Alternatively, the second locking element comprises at least one outward bulge, and the first locking element comprises at least one recess, which outward bulge is adapted to be at least partially received in a recess of an adjacent coupled tile for the purpose of realizing a locked coupling. It is also conceivable that the first and second locking elements are not formed by a bulge-recess combination, but by another combination of co-acting profiled surfaces and/or high-friction contact surfaces. In this latter embodiment, the first locking element and/or the second locking element may be formed by a (flat or otherwise shaped) contact surface composed of a, optionally separate, plastic material configured to generate friction with the other locking element of another tile in engaged (coupled) condition. Examples of plastics suitable to generate friction include:

Acetal (POM), being rigid and strong with good creep resistance. It has a low coefficient of friction, remains stable at high temperatures, and offers good resistance to hot water;

Nylon (PA), which absorbs more moisture than most polymers, wherein the impact strength and general energy absorbing qualities actually improve as it absorbs moisture. Nylons also have a low coefficient of friction, good electrical properties, and good chemical resistance;

Polyphthalamide (PPA). This high performance nylon has through improved temperature resistance and lower moisture absorption. It also has good chemical resistance;

Polyetheretherketone (PEEK), being a high temperature thermoplastic with good chemical and flame resistance combined with high strength. PEEK is a favorite in the aerospace industry;

Polyphenylene sulfide (PPS), offering a balance of properties including chemical and high-temperature resistance, flame retardance, flowability, dimensional stability, and good electrical properties;

Polybutylene terephthalate (PBT), which is dimensionally stable and has high heat and chemical resistance with good electrical properties;

Thermoplastic polyimide (TPI) being inherently flame retardant with good physical, chemical, and wear-resistance properties.

Polycarbonate (PC), having good impact strength, high heat resistance, and good dimensional stability. PC also has good electrical properties and is stable in water and mineral or organic acids; and Polyetherimide (PEI), maintaining strength and rigidity at elevated temperatures. It also has good long-term heat resistance, dimensional stability, inherent flame retardance, and resistance to hydrocarbons, alcohols, and halogenated solvents.

The performance of many of the above polymers can also be enhanced using certain additives which reduce fiction (if desired). The high-friction polymer material may, for example, be applied as a (separate) material strip. Application of this high-friction polymer material allows the distant side (outer side) of the upward tongue and the downward flank to have a substantially flat design.

In an embodiment of the tile according to the invention the first locking element is positioned at a distance from an upper side of the upward tongue. Positioning the first locking element at a distance from the upper side of the upward tongue has a number of advantages. A first advantage is that this positioning of the first locking element can facilitate the coupling between adjacent tiles, since the first locking element will be positioned lower than (a lower part of) the aligning edge of the upward tongue, whereby the coupling between two coupling parts can be performed in stages. During the coupling process the tongue sides facing toward the associated flanks will first engage each other, after which the locking elements engage each other, this generally requiring a less great maximum pivoting (amplitude), and thereby deformation of a second coupling part of an adjacent tile, than if the first aligning edge and the first locking element were to be located at more or less the same height. A further advantage of positioning the first locking element at a distance from an upper side of the upward tongue is that the distance to the resilient connection between each coupling part and the base layer, generally formed by the resilient bridge of each coupling part, is increased, whereby a torque exerted on the coupling parts can be compensated relatively quickly by the locking elements, which can further enhance the reliability of the locking. In case the first locking element and second locking element would not be applied, it may be favourable that side of the upward tongue facing away from the upward flank is positioned at a distance from the downward flank in coupled condition of adjacent tiles.

In a preferred embodiment, a side of the downward tongue facing away from the downward flank is provided with a third locking element, and wherein the upward flank is provided with a fourth locking element, said third locking element being adapted to cooperate with a fourth locking element of another tile. This would result in an additional inner locking mechanism, which could further improve the stability and reliability of the coupling. Also in this embodiment, the third (or fourth) locking element may be formed by one or more bulges, wherein the fourth (or third) locking element may be formed by one of more complementary recesses adapted to co-act with said bulges in coupled condition of adjacent tiles. Preferably, the co-action between the third locking element and the fourth locking element, in coupled condition of two tiles, defines a tangent T1 which encloses an angle A1 with a plane defined by the tile, which angle A1 is smaller than an angle A2 enclosed by said plane defined by the tile and a tangent T2 defined by a co-action between an inclined part of a side of the upward tongue facing toward the upward flank and an inclined part of a side of the downward tongue facing toward the downward flank. More preferably, the greatest difference between angle A1 and angle A2 is situated between 5 and 10 degrees. It is imaginable that shortest distance between an upper edge of the downward tongue and a lower side of the base layer defines a plane, wherein the third locking element and at least a part of the downward tongue are situated at opposite sides of said plane. In this case, the third locking element protrudes with respect to the tile edge defined by an upper section or upper surface of the tile. Here, the third locking element may protrude into an adjacent tile in a coupled condition which may further improve the tile coupling. It is advantageous in case the minimum distance between said locking surface and an upper side of the tile is smaller than the minimum distance between an upper side of the upward tongue and said upper side of the tile. This will reduce the maximum deformation of the second (or first) coupling part, whereas the connection process and deformation process can be executed in successive steps. Less deformation leads to less material stress which is in favour of the life span of the coupling part(s) and hence of the tile(s).

Each tile to be used in the system according to the invention comprises one or more first coupling parts, one or more second coupling parts, and/or a combination of at least one first coupling part and at least one second coupling part. It is conceivable that one or more (remaining) edges of a tile is/are provided with an alternative coupling part, such as a conventional angling down profile, as for example disclosed in U.S. Pat. No. 4,426,820, the content of which is incorporated in this document by reference. Such an angling down profile typically comprises a first edge (third coupling part) comprising a sideward tongue extending in a direction substantially parallel to the upper side of the panel, the bottom front region of said sideward tongue being rounded at least partly, the bottom back region of said tongue being configured as bearing region, wherein the bottom back region is located closer to the level of the upper side of the panel than a lowest part of the bottom front region, and an opposite, second edge (fourth coupling part) comprising a recess for accommodating at least a part of the sideward tongue of a further panel, said recess being defined by an upper lip and a lower lip, said lower lip being provided with a upwardly protruding shoulder for supporting the bearing region of the sideward tongue, the sideward tongue being designed such that locking takes place by an introduction movement into the recess of the sideward tongue a further panel and a angling down movement about an axis parallel to the first edge, as a result of which a top side of the sideward tongue will engage the upper lip and the bearing region of the sideward tongue will be supported by and/or facing the shoulder of the lower lip, leading to locking of adjacent panels at the first and second edges in both horizontal direction and vertical direction.

In an embodiment a plurality of sides (or edges) of the tile comprise a first coupling part, and a plurality of sides of the tile comprise a second coupling part, wherein each first coupling part and each second coupling part lie on opposite sides of the tile. In this way each side of the tile can be provided with a coupling part, this increasing the coupling options of the tile. By positioning the first coupling part and the second coupling part on opposite sides it will be relatively simple for a user to lay a floor formed by tiles according to the invention, since each tile can be formed in the same way. Adjacent edges of a tile may be provided with different types coupling parts.

In the system according to the invention, it is imaginable that all or at least a number of tiles are/is identical. It is, however, also imaginable that the tile system comprises different types of tiles (e.g. A tiles and B tiles respectively), wherein the arrangement and/or type of coupling parts used in a first type of tile (A) differs from the arrangement and/or type of coupling parts used in a second type of tile (B). Here, preferably the coupling parts of the first type of tile (A) as applied on one pair of opposite edge portions are arranged in a mirror-inverted manner relative to the coupling parts along the same pair of opposite edge portions of the second type of tiles (B). In case of square or rectangular tiles, and seen from a top view and in clockwise direction, the first type of tile (A) may be provided at its edges, successively with a first coupling part (I), a second coupling part (II), a second coupling part (II), and a first coupling part (I-II-II-I configuration), while the second type of tile (B) may be provided at its edges, successively with a first coupling part (I), a first coupling part (I), a second coupling part (II), and a second coupling part (I-I-II-II configuration). This will allow the different panels to be installed in unconventional and/or advanced patterns, such as herringbone patterns. An advantage of identical and mirror-inverted tiles to be used in a system according to the invention is that the tiles can be produced easily, wherein, for example, all first sides of A and B type tiles can be machined, for instance, in a first machine. Then the A type tiles proceed to another machine where the second sides are machined. The boards that are to be provided with mirror-inverted coupling parts, for instance the B type tiles, are however rotated through 180 in the same plane before machining of the second sides. Thus the two types of board A and B can be manufactured using the same machines and the same set of tools. Distinctive visual markings, for example coloured labels, symbolic labels, and/or text labels, may be applied to different tile types to allow a user to easily recognize the different panel types during installation. Preferably the visual markings are not visible in a coupled condition of the tiles (from a top view). A visual marking may, for example, be applied onto the upper side of the upward tongue and/or inside the upward groove and/or inside the downward groove. It is imaginable that the system according to the invention comprises more than two different types of tiles.

The different tile types may have different sizes and/or shapes. It is imaginable that each edge portion of each tile is provided with a first coupling part and/or a second coupling part, and wherein preferably edge portions are provided with different coupling parts. Commonly, the tiles have a square, rectangular, triangular, hexagon, octagon, or other polygonal shape.

The invention also relates to a tile covering, in particular floor covering, consisting of mutually coupled tiles according to the invention. The invention also relates to a tile for use in multi-purpose tile system according to the invention.

BRIEF DESCRIPTION OF THE DRAWINGS

The invention will be elucidated on the basis of non-limitative exemplary embodiments shown in the following figures. Herein shows:

FIG. 2b a schematic representation of a coupled position of two floor tiles comprising coupling parts as shown in FIG. 2a;

FIG. 3b a schematic representation of a coupled position of two floor tiles comprising coupling parts as shown in FIG. 3a;

FIG. 4b a schematic representation of a coupled position of two floor tiles comprising coupling parts as shown in FIG. 4a;

FIG. 7a schematic top view of a floor tile according to the invention in a first possible arrangement;

FIG. 7b a schematic top view of a floor tile according to the invention in a second possible arrangement;

FIG. 7c a schematic top view of a second embodiment of the floor tile with the arrangement shown in FIG. 7b;

FIG. 7g a schematic top view of a fourth configuration of a tile system according to the invention comprising a plurality of floor tiles as shown in FIGS. 7a-b;

DESCRIPTION OF THE INVENTION

Figure 1:
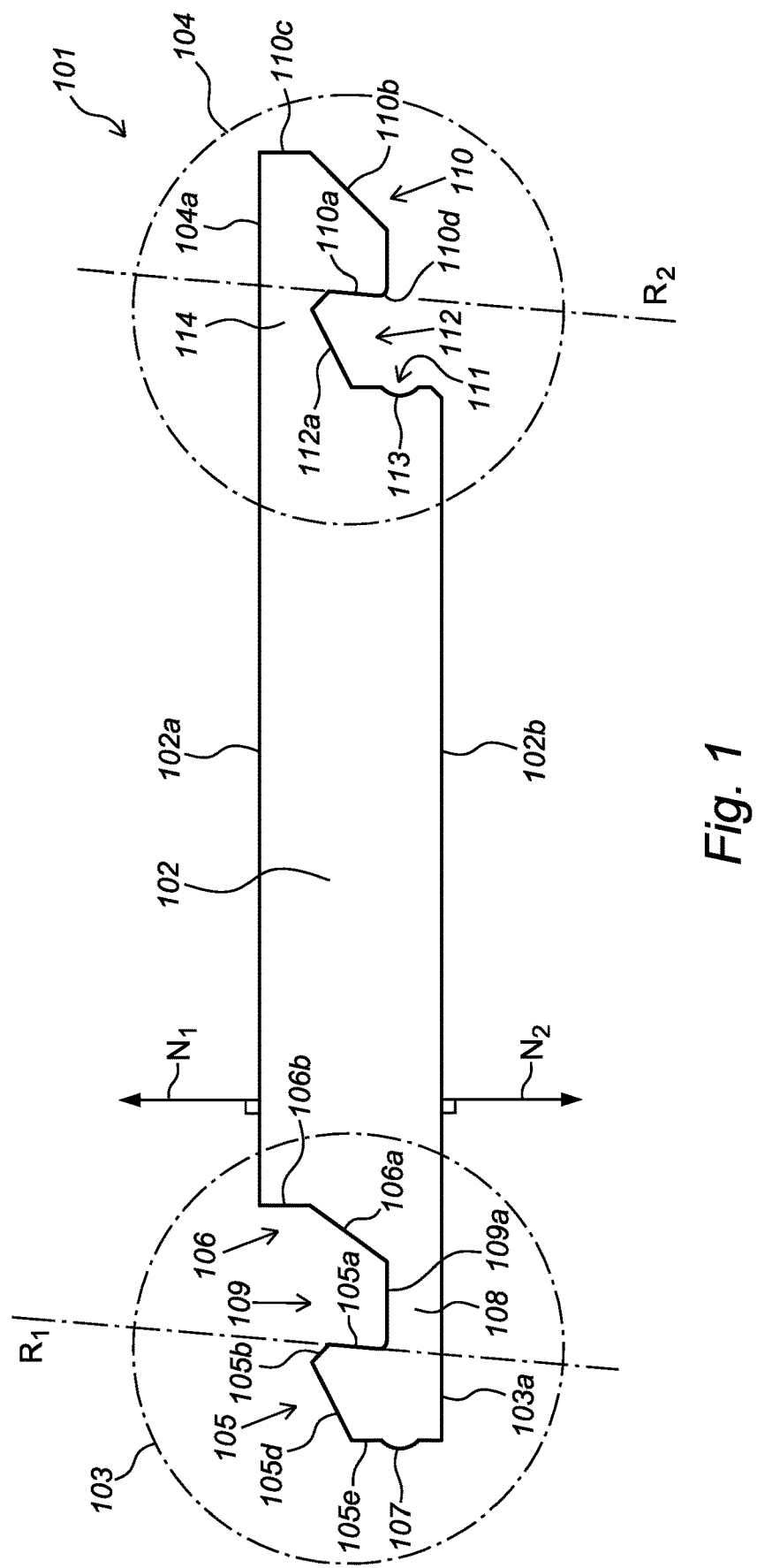
FIG. 1 schematically a transverse side view of a first embodiment of a floor tile according to the invention.

FIG. 1 shows a side view of a rectangular multi-purpose floor tile 101 according to the invention. Floor tile 101 comprises a rigid base layer 102 which is at least partially made of a closed cell foam plastic material, preferably provided with a toughening agent, provided with an upper side 102a and a lower side 102b, and coupling parts 103, 104 positioned on opposite (longitudinal) sides of rigid base layer 102 and connected integrally to rigid base layer 102. A first coupling part 103 comprises an upward tongue 105, an upward flank 106 and an upward groove 109 formed between upward tongue 105 and upward flank 106. A side 105a of upward tongue 105 facing toward upward flank 106 extends in the direction of the normal N1 of the upper side 102a of rigid base layer 102. The tangent R1 and the normal N1 of upper side 102a of rigid base layer 102 are thus directed toward each other (converging orientation), wherein the angle enclosed by R1 and N1 amounts to 0-10, in particular about 3-5 degrees. Another side 105b of upward tongue 105 facing toward upward flank 106 forms an aligning edge enabling facilitated realization of a coupling to an adjacent floor tile. As shown, this side 105b functioning as aligning edge is directed away from the normal N1 of upper side 102a of the rigid base layer. An upper side 105d of upward tongue 105 does however extend in the direction of the normal N1 of upper side 102a of rigid base layer 102, and runs inclining downward in the direction of the side 105e of upward tongue 105 facing away from upward flank 106. This chamfering provides the option of giving the complementary second coupling part 104 a more robust and therefore stronger form. The side 105e of upward tongue 105 facing away from upward flank 106 is oriented substantially vertically and is moreover provided with a first locking element 107 in the form of an outward bulge 107. A lower part 106a of upward flank 106 is oriented diagonally, while an upper part 106b of upward flank 106 is shown to be substantially vertical and forms a stop surface for second coupling part 104. A lower wall part 109a of upward groove 109 is oriented substantially horizontally in this exemplary embodiment. A bridge 108 lying between lower wall part 109a of upward groove 109 and a lower side 103a has a somewhat elastic nature and is adapted to allow upward tongue 105 to pivot relative to upward flank 106, this resulting in a (temporary) widening of upward groove 109, whereby coupling of floor tile 101 to an adjacent floor tile can be facilitated. Second coupling part 104 is substantially complementary to first coupling part 103. Second coupling part 104 comprises a downward tongue 110, a downward flank 111 and a downward groove 112 formed between downward tongue 110 and downward flank 111. A side 110a of downward tongue 110 facing toward downward flank 111 lies in the direction of the normal N2 of the lower side 102b of rigid base layer 102. This means that a tangent R2 of side 110a of downward tongue 110 and the normal of the lower side 102b of rigid base layer 102 are mutually converging. In this exemplary embodiment the tangent R2 and the normal N2 enclose a mutual angle of 5 degrees. A side 110b facing away from downward flank 111 is diagonally oriented, but has a flatter orientation than the complementary side 106a of upward flank 106, whereby a gap (air space) will be formed in the coupled position, which will generally facilitate coupling between two floor tiles 101. The inclining side 110b of downward tongue 110 also functions as aligning edge for the purpose of further facilitating coupling between two floor tiles 101. Another side 110c facing away from downward flank 111 takes a substantially vertical form and forms a complementary stop surface for stop surface 106b of upward flank 106 (of an adjacent floor tile). Downward tongue 110 is further provided with a side 110d which is facing toward downward flank 111 and which functions as aligning edge for first coupling part 103 of an adjacent floor tile. Because upper side 105d of upward tongue 105 has an inclining orientation, an upper side 112a of downward groove 112 likewise has an inclining orientation, whereby the (average) distance between upper side 112a of downward groove 112 and an upper side 104a of second coupling part 104 is sufficiently large to impart sufficient strength to second coupling part 104 as such. Downward flank 111 is oriented substantially vertically and is provided with a second locking element 113 in the form of a recess 113 adapted to receive the outward bulge 107 of upward tongue 105 (of an adjacent floor tile).

A bridge 114 lying between upper side 112a of downward groove 112 and upper side 104a has a somewhat elastic nature and is adapted to allow downward tongue 110 to pivot relative to downward flank 111, this resulting in a (temporary) widening of downward groove 112, whereby coupling of floor tile 101 to an adjacent floor tile can be facilitated (not shown). The shown floor tile 101 can be part of a multi-purpose tile system according to the invention.

Figure 2A:
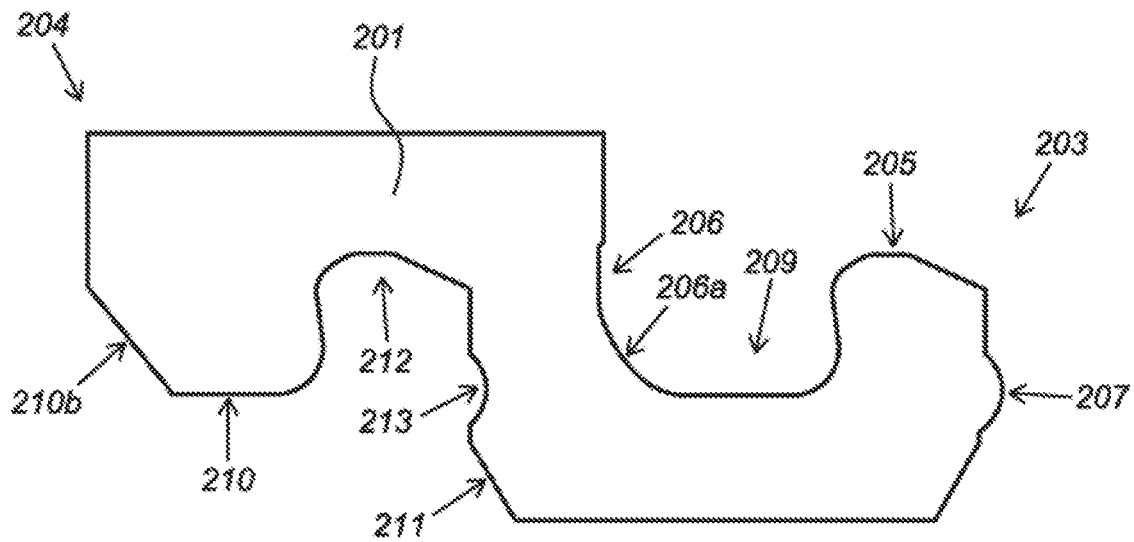
FIG. 2a a schematic representation of coupling parts of a second embodiment of a floor tile according to the invention.
Figure 2B:
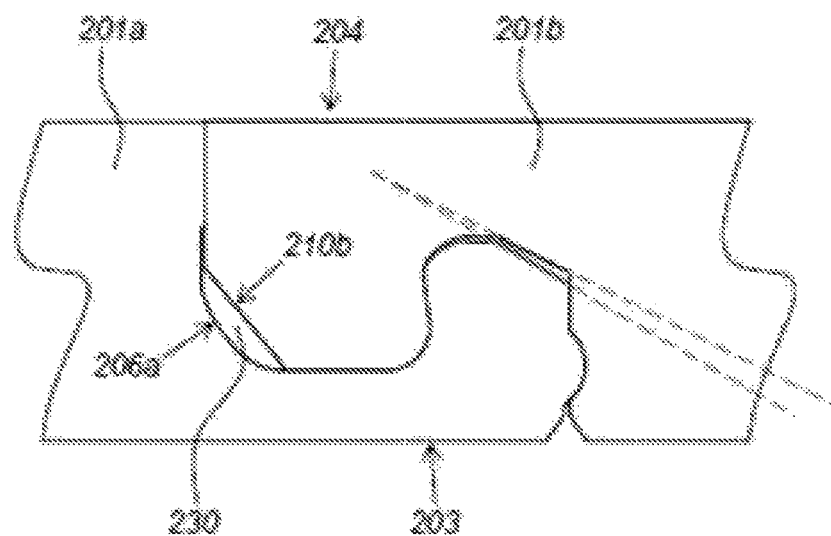

FIG. 2a shows a schematic representation of coupling parts 203, 204 of a second embodiment of a floor tile 201 according to the invention. FIG. 2b shows a schematic representation of the coupled position of two floor tiles 201a, 201b comprising coupling parts 203, 204 as shown in FIG. 2a.

The first coupling part 203 and the second coupling part 204 have equal functionalities as the first and second coupling parts shown in FIG. 1. The first coupling part 203 comprises an upward tongue 205, an upward flank 206 lying at a distance from the upward tongue 205 and an upward groove 209 formed between the upward tongue 205 and the upward flank 206. The second coupling part 204 comprises a downward tongue 210, a downward flank 211 lying at a distance from the downward tongue 210, and a downward groove 212 formed between the downward tongue 210 and the downward flank 211. A side 210b facing away from the downward flank 211 is diagonally oriented. The side 210b has a substantially straight design, where the complementary side 206a of the upward flank 206 has a rounded design. An air gap 230 is formed in the coupled position shown in FIG. 2b.

The first coupling part 203 comprises a first locking element 207 which is adapted for co-action with a second locking element 213 which is provided in the flank 211 of the second coupling part 204. In one embodiment, the first locking element 207 may be a bulge and the second locking element 213 may be a recess. The bulge and the recess may be configured to be in contact with one another when the tile and the adjacent tile are in a locked position such that no gap exists between the bulge and the recess.

The difference between the embodiment shown in FIGS. 2a-b and FIG. 1 is that the tongues 205, 210, flanks 206, 211 and grooves 209, 212 have a substantially rounded design.

Figure 3A:
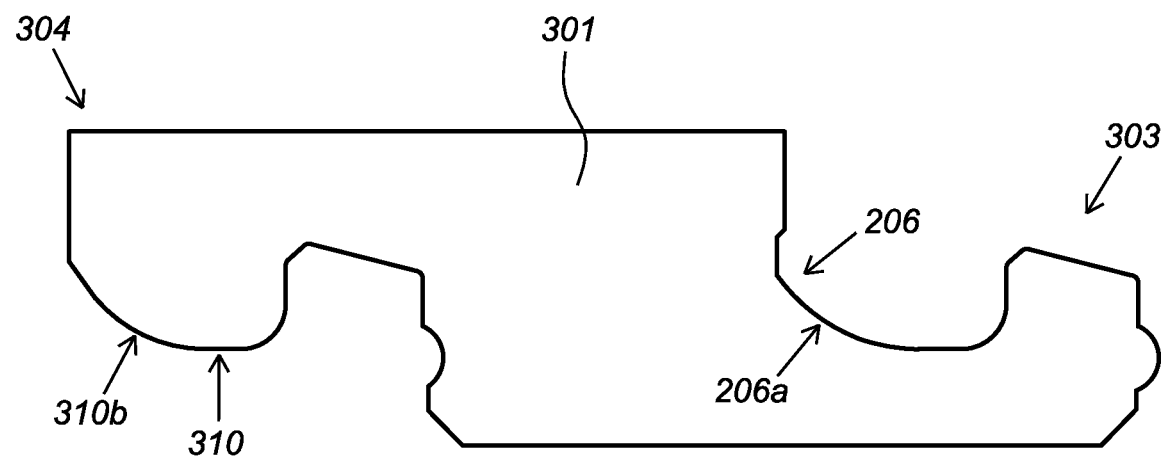
FIG. 3a a schematic representation of coupling parts of a third embodiment of a floor tile according to the invention.
Figure 3B:
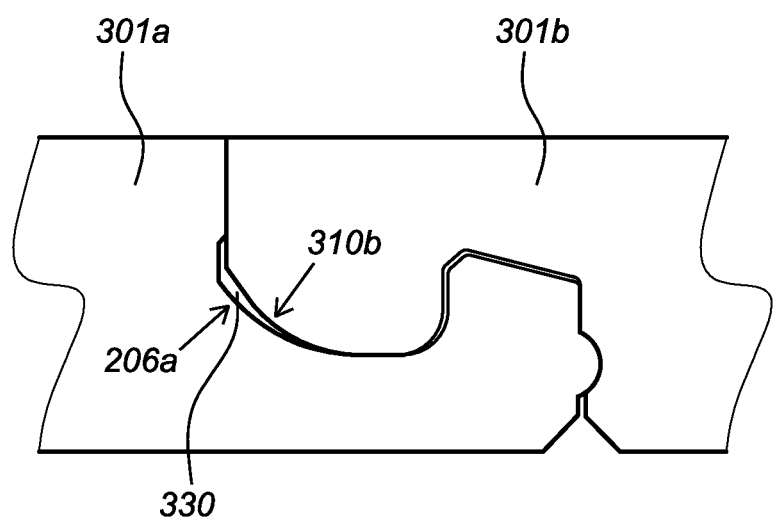

FIG. 3a shows a schematic representation of coupling parts 303, 304 of a third embodiment of a floor tile 301 according to the invention. FIG. 3b shows a coupled position of two floor tiles 301a, 301b comprising coupling parts 303, 304 as shown in FIG. 3a. The air gap 330 formed between a side 310b of the downward tongue and the complementary side 306a of the upward flank 206 is substantially smaller than the air gap shown in the embodiment of FIG. 2b.

Figure 4A:
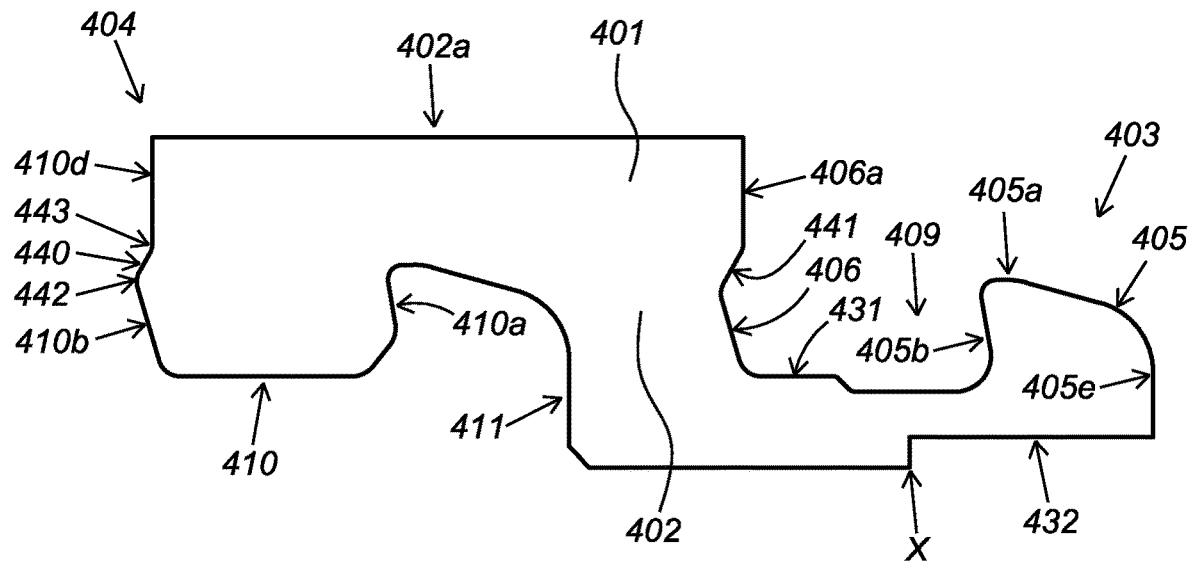
FIG. 4a a schematic representation of coupling parts of a fourth embodiment of a floor tile according to the invention.
Figure 4B:
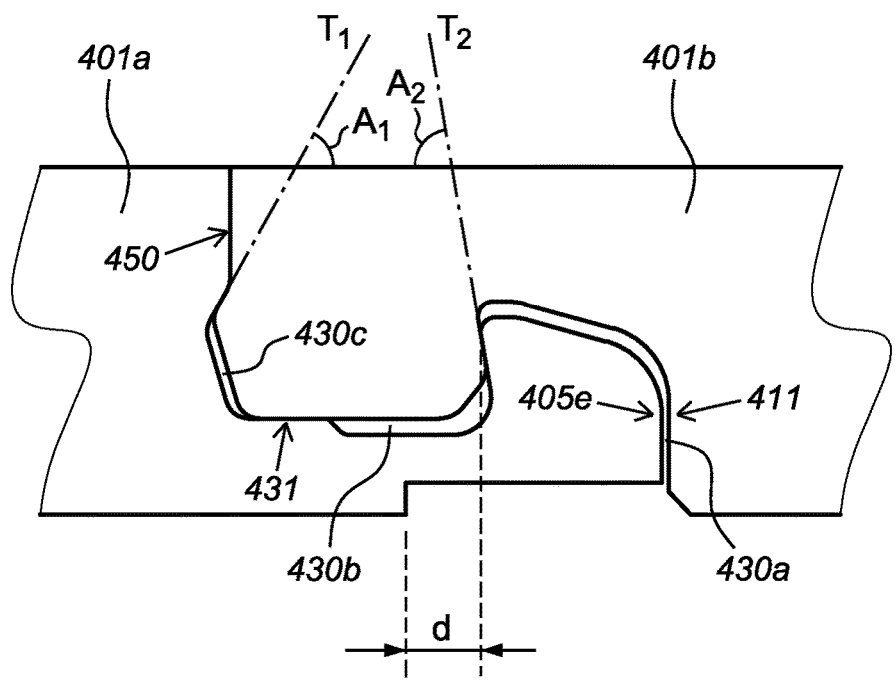

FIG. 4a shows a schematic representation of coupling parts 403, 404 of a fourth embodiment of a floor tile 401 according to the invention. FIG. 4b shows a schematic representation of the coupled position of two floor tiles 401a, 401b comprising coupling parts 403, 404 as shown in FIG. 4a. The floor tile 401 comprises a rigid base layer 402 which is at least partially made of a closed cell foam plastic material. The tile 401 comprises a third locking element 440 and a complementary fourth locking element 441. A side 410b of the downward tongue 410 facing away from the downward flank 411 is provided with the third locking element 440. The upward flank 406 of the first coupling part 403 is provided with the fourth locking element 441. The third locking element 440 is adapted to cooperate with the fourth locking element 441 of another tile, as shown in FIG. 4b. FIG. 4a shows the co-action between the third locking element 440 and the fourth locking element 441 in coupled condition of two tiles 401a, 401b. The co-action defines a tangent T1 which encloses an angle A1 with a plane defined by the tile 401, which angle A1 is smaller than an angle A2 enclosed by said plane defined by the tile 401 and a tangent T2 defined by a co-action between an inclined part of a side of the upward tongue 405 facing toward the upward flank 406 and an inclined part of a side 410a of the downward tongue 410 facing toward the downward flank 411. The greatest difference between angle A1 and angle A2 is situated between 5 and 10 degrees. The third locking element 440 comprises a locking surface 443 having a distal end 442 which is distally located from a plane 450 defined by an upper side 406a of the upward flank 406 and a side 410d of the downward tongue 410 facing away from the downward flank 411, in a coupled condition.

The distance between said locking surface 443 and an upper side 402a of the tile 401 is smaller than the distance between an upper side 405a of the upward tongue 405 and said upper side 402a of the tile 401. FIG. 4b shows that a side 405e of the upward tongue 405 facing away from the upward flank 406 is positioned at a distance from the downward flank 411. A first air gap 430a is formed between the upward tongue 405 and the downward flank 411. A second air gap 430b is formed between the upward groove 409 and the downward tongue 410. The downward tongue 410 is in contact with a support surface 431 of the upward groove 409. A third air gap 430c is formed between the side 410b of the downward tongue 410 facing away from the downward flank 411 and the upward flank 406.

The bottom of the floor tile 401 comprises a bottom recess 432 which extends from point X to the end side 405e of the upward tongue 405. Preferably, the starting point X of the bottom recess 432 is at a distance d from a side 405b of the upward tongue 405 facing towards the upward flank 406.

Figure 5:
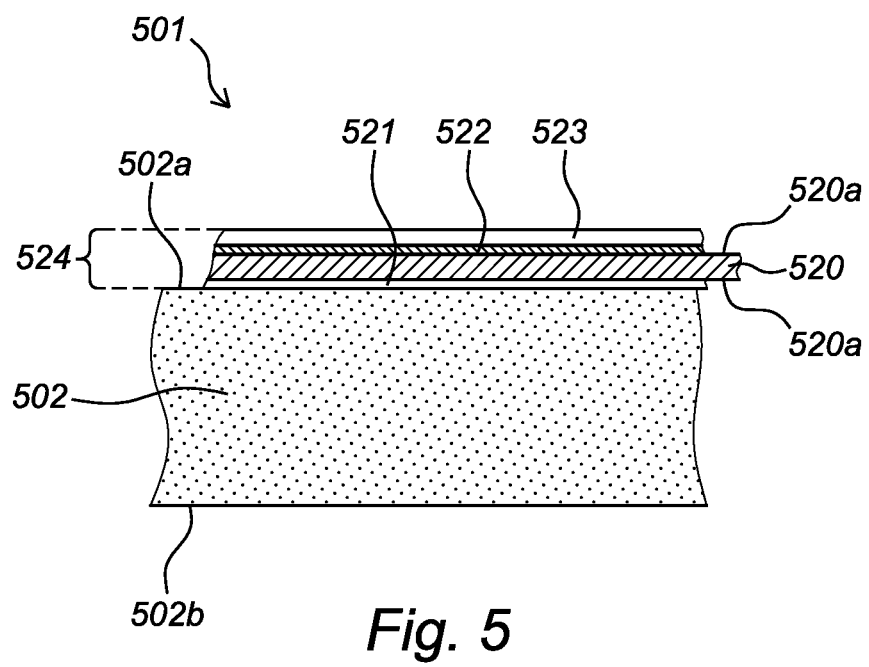
FIG. 5 schematically a side view of the laminate details of a possible embodiment of a floor tile according to the invention.

FIG. 5 show a side view of the laminate details of a possible embodiment of a floor tile 501 according to the invention. The floor tile 501 comprises a rigid foam base layer 502 formed of a poly-foam or foamed plastic material having a lower side or bottom foam surface 502b and an upper side 502a. The floor tile 501 further comprises an upper substrate layer 520, formed of a non-foam plastic or metallic material and has a lower surface 520b and an upper surface 520a. The upper substrate layer 520 is provided over the upper foam surface 502a of the rigid base layer 502. An adhesive 521, which can be a layer or coating, is provided between the upper surface 502a of the rigid base layer 502 and the lower surface 520b of the upper substrate layer 520 to join the upper substrate layer 520 and the rigid base layer 502 together. The floor tile 501 can possibly include a design pattern or a decorative appearance of any selected type on or at the upper surface 520a of the substrate layer 520. The design pattern can be a wood grain design, a mineral grain design that resembles marble, granite or any other natural stone grain, or a colour pattern, colour blend or single colour to name just a few design possibilities. The decoration or design pattern can be printed onto or otherwise applied to the upper surface 520a of the upper substrate layer 520, but is preferably provided on a separate printing film or design layer 522 of any suitable known plastic material. The design layer 522 is covered by a transparent or semi-transparent abrasion resistant wear layer 523 of known material and fabrication through which the design layer 522 can be viewed. The top of the wear layer 523 is the top surface of the floor tile 501. The floor tile 501 can be provided with any of the coupling elements shown in the previous figures.

The upper substrate layer 520, the design layer 522 and the wear layer 523 can be initially laminated together to form an upper substrate laminate subassembly 524. The laminate subassembly 524 and the foam base layer 502 can then be laminated together to form the tile 501.

Figure 6:
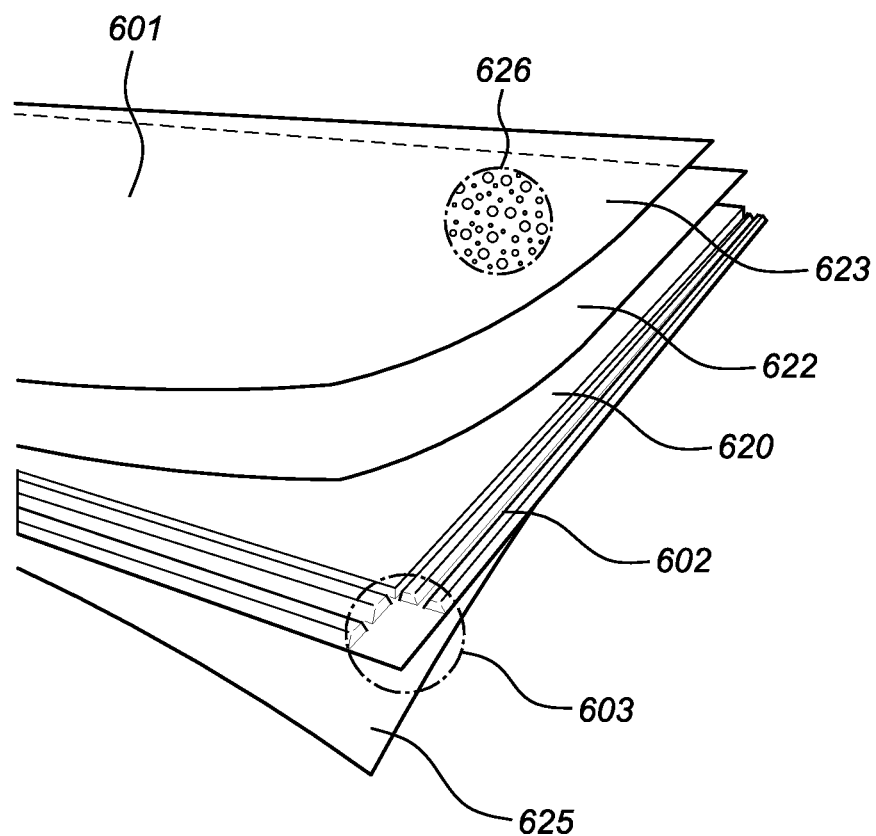
FIG. 6 a perspective view of the laminate details of a further possible embodiment of a floor tile according to the invention.

FIG. 6 shows a perspective view of the laminate details of a further possible embodiment of a floor tile 601 according to the invention, wherein the layers of the laminate are shown separated partially. The floor tile 601 is provided with coupling parts 603 at the edge portions of the tile 601. This can be any suitable coupling part 603, for example the coupling parts shown in FIGS. 1-4. The floor tile 601 comprises a substantially rigid base layer 602 which is at least partially made of closed cell foam polyvinyl chloride material, for example polyvinyl chloride comprising sodium carbonate filler. The floor tile 601 further comprises an upper substrate layer 620, or reinforcing layer 620, affixed to the upper side of the base layer 602. In the shown embodiment, the reinforcing layer 620 is at least partially made of polyvinyl chloride resin comprising a plasticizer and a carbonate filler. The reinforcing layer 620 enhances the durability of the floor tile 601 and provides resistance against scratches and other small damages. A design layer 622 is provided on top of the reinforcing layer 620. The design layer 622 is preferably a thermoplastic film layer. The design layer 622 is covered by a transparent or semi-transparent abrasion resistant wear layer 623 through which the design layer 622 can be viewed. The wear layer 623 is a protection layer and is preferably at least partially made of a polyvinyl chloride resin comprising a DOTP plasticizer and calcium and zinc stearate. The top surface of the floor tile 601 comprises a ceramic bead polymer layer 626. The ceramic bead polymer layer 626 forms a protective overlay 626 due to its wear resistance and corrosion and erosion resistance. The floor tile 601 further comprises a backing layer 625. The backing layer 625 preferably has good sound damping properties. The backing layer 625 is preferably shock-absorbing. The floor tile 601 is fully waterproof and has a very good moisture stability. The possible embodiment of FIG. 6 may comprise all of the abovementioned layers, or any number of the mentioned layers in combination. For instance, the ceramic bead polymer layer 626 may optionally be omitted.

FIG. 7a shows a top view of a schematic representation of a floor tile A according to the invention in a first possible arrangement. The floor tile A comprises a plurality of first coupling parts G3L provided at a first edge portion A1 of the tile A and at a second edge portion A2. The floor tile A comprises a plurality of second coupling parts T3L provided at a third edge portion A3, opposite of first edge portion A1, and at a fourth edge portion A4. The first coupling parts G3L can be any type of first coupling part G3L comprising a, preferably single, upward tongue, at least one upward flank lying at a distance from the upward tongue and a single upward groove formed between the upward tongue and the upward flank, according to the invention. The second coupling parts T3L can be any type of second coupling part comprising a, preferably single, downward tongue, at least one downward flank lying at a distance from the downward tongue, and a single downward groove formed between the downward tongue and the downward flank, according to the invention. Tile A has a substantially rectangular design.

FIG. 7b shows a top view of a schematic representation of a floor tile B according to the invention in a second possible arrangement. The floor tile B is a mirror image of the floor tile A shown in FIG. 7a. The floor tile B comprises a plurality of first coupling parts G3L provided at a third edge portion B3 of the tile B and at a second edge portion B2. The floor tile B comprises a plurality of second coupling parts T3L provided at a first edge portion B1 and at a fourth edge portion B4. Tile B has a substantially rectangular design.

FIG. 7c shows a top view of a second embodiment of a floor tile C, which has a similar arrangement as the floor tile B shown in FIG. 7b. However the size of tile C differs from the size of tile B. Tile C has a substantially square design.

Due to the specific arrangement of first coupling parts G3L and second coupling parts T3L, it is possible to create a wide range of possible configurations of tile systems according to the invention. FIGS. 7d-h show examples of possible embodiments of configurations of floor tile systems consisting of mutually coupled tiles A and B and/or C. The tiles A, B, C are configured to co-act in such manner that coupled tiles are substantially locked both in a direction parallel to the plane defined by the tiles as well as in a direction perpendicular to said place defined by the tiles. Tiles with corresponding reference numbers are identical.

Figure 7D:
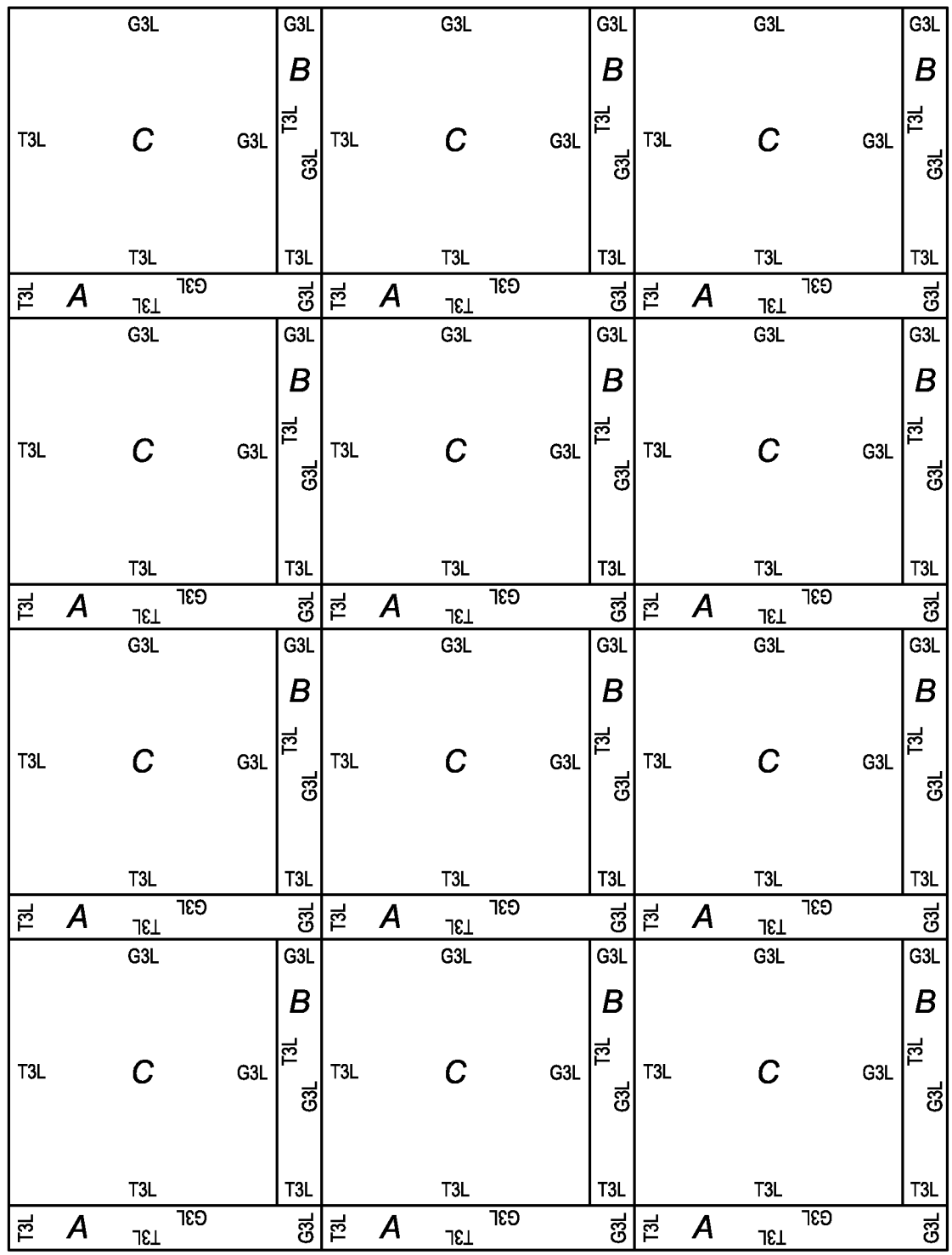
FIG. 7d a schematic top view of first configuration of a tile system according to the invention comprising a plurality of floor tiles as shown in FIGS. 7a-c.

FIG. 7d shows a top view of a schematic representation of a first configuration of a tile system 700d according to the invention, comprising a plurality of floor tiles A, B, C as shown in FIGS. 7a-c. Each substantially square tile C is coupled with multiple substantially rectangular tiles A, B. The tiles can possibly include a design pattern or a decorative appearance at the upper surface of the tile. The design of the tiles can for example be chosen such that the rectangular tiles A, B have a different design than the square tiles C. The tile system 700d shows that the rectangular tiles A, B may for instance form a grout frame around the square tiles C.

Figure 7E:
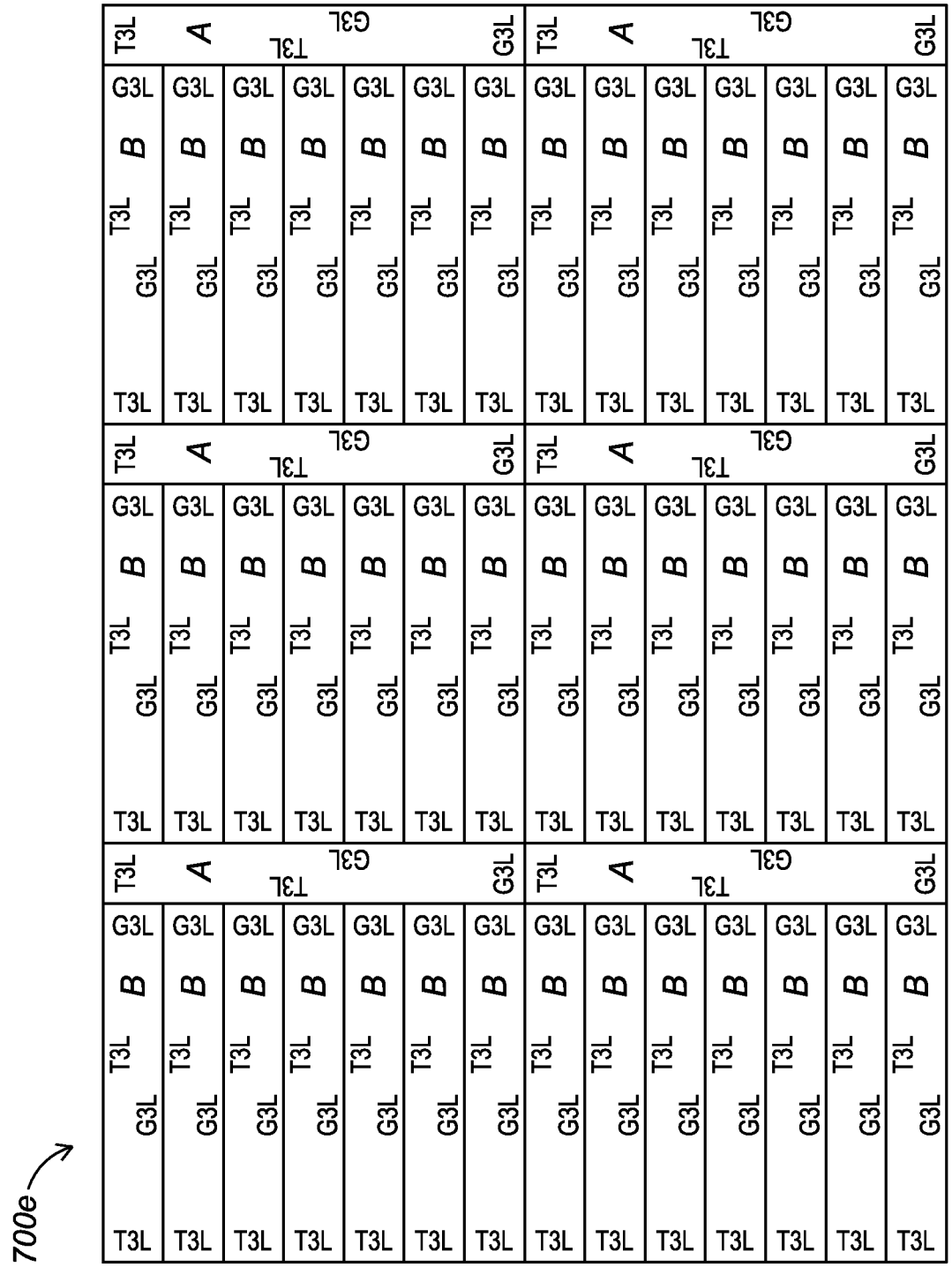
FIG. 7e a schematic top view of a second configuration of a tile system according to the invention comprising a plurality of floor tiles as shown in FIGS. 7a-b.

FIG. 7e shows a top view of a schematic representation of a second configuration of a tile system 700e according to the invention, comprising a plurality of floor tiles A, B as shown in FIGS. 7a-b. The first edge portions A1 and the third edge portions A3 of each vertical oriented floor tile A are connected with a plurality of horizontal oriented floor tiles B.

Figure 7F:
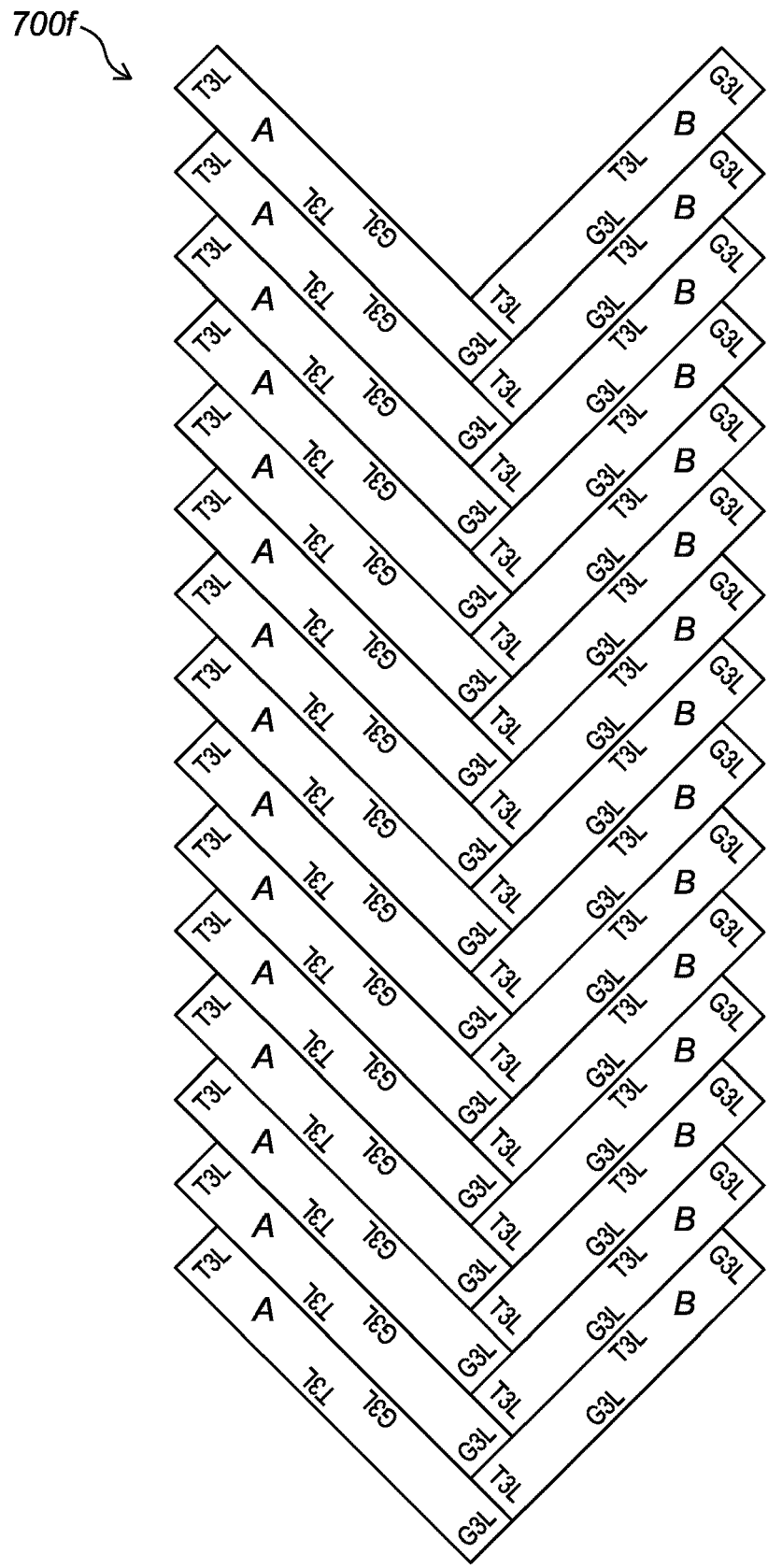
FIG. 7f schematic a top view of a third configuration of a tile system according to the invention comprising a plurality of floor tiles as shown in FIGS. 7a-b.

FIG. 7f shows a top view of a schematic representation of a third configuration of a tile system 700f according to the invention, comprising a plurality of floor tiles A, B as shown in FIGS. 7a-b. The figure shows a herringbone structure.

Figure 7G:
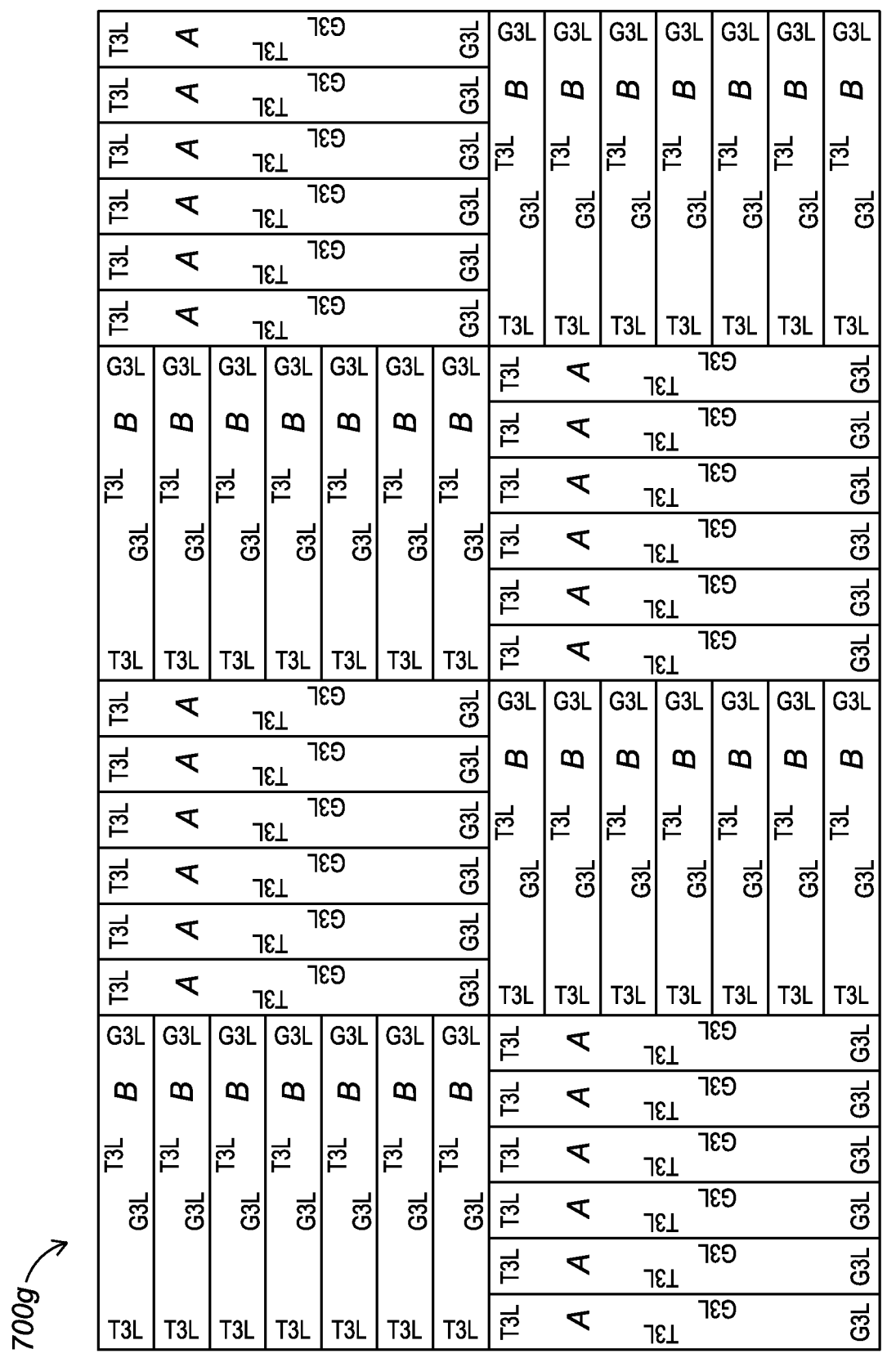

FIG. 7g shows a top view of a schematic representation of a fourth configuration of a tile system 700g according to the invention comprising a plurality of floor tiles A, B as shown in FIGS. 7a-b. A plurality of series of six A-type floor tiles is connected to a plurality of series of six perpendicular oriented B-type floor tiles, thereby forming a chessboard pattern.

Figure 7H:
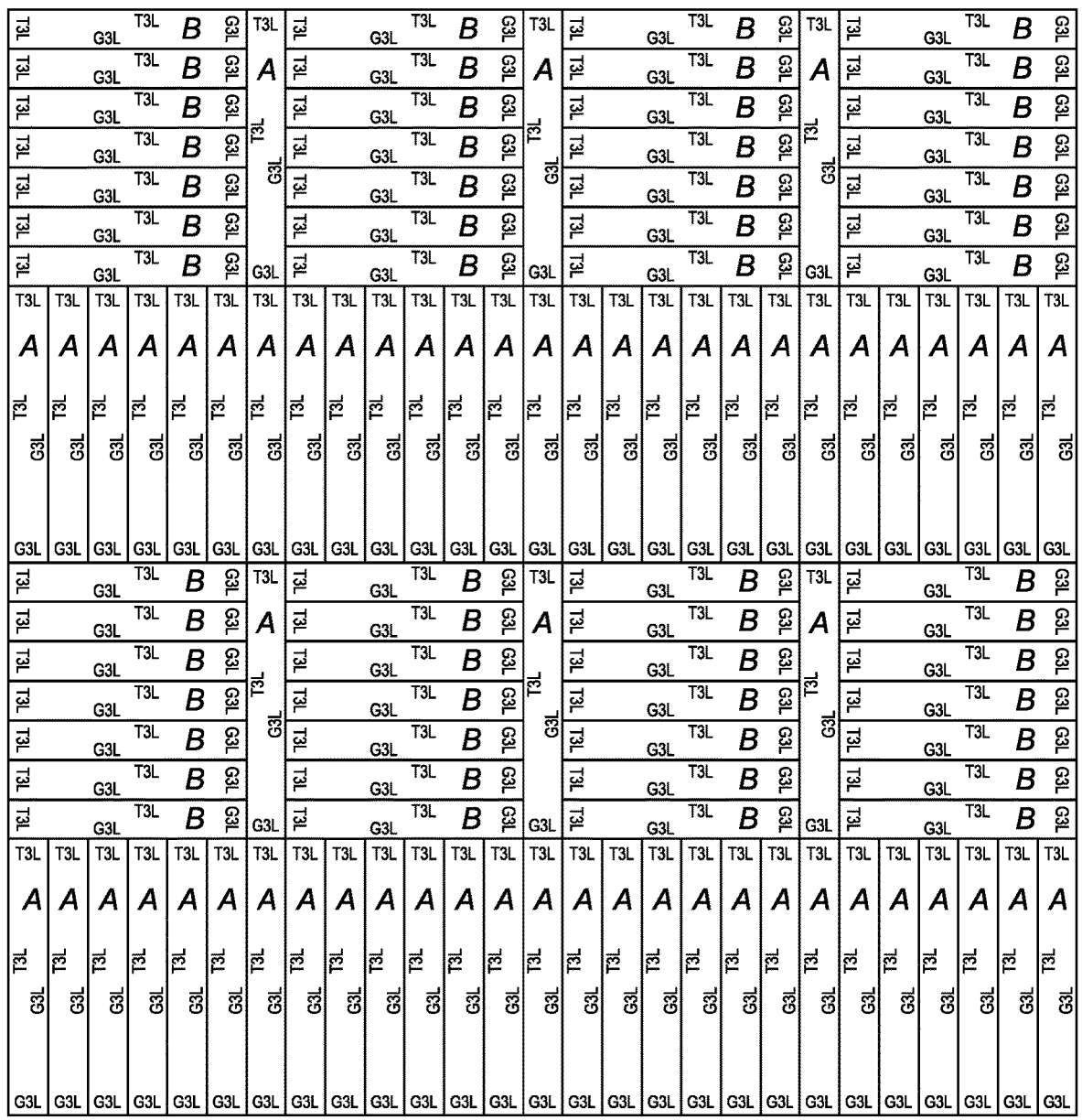
FIG. 7h a top view of a fifth configuration of a tile system according to the invention comprising a plurality of floor tiles as shown in FIGS. 7a-b.

FIG. 7h shows a top view of a schematic representation of a fifth possible configuration of a tile system 700h according to the invention comprising a plurality of floor tiles A, B as shown in FIGS. 7a-b.

Figure 8:
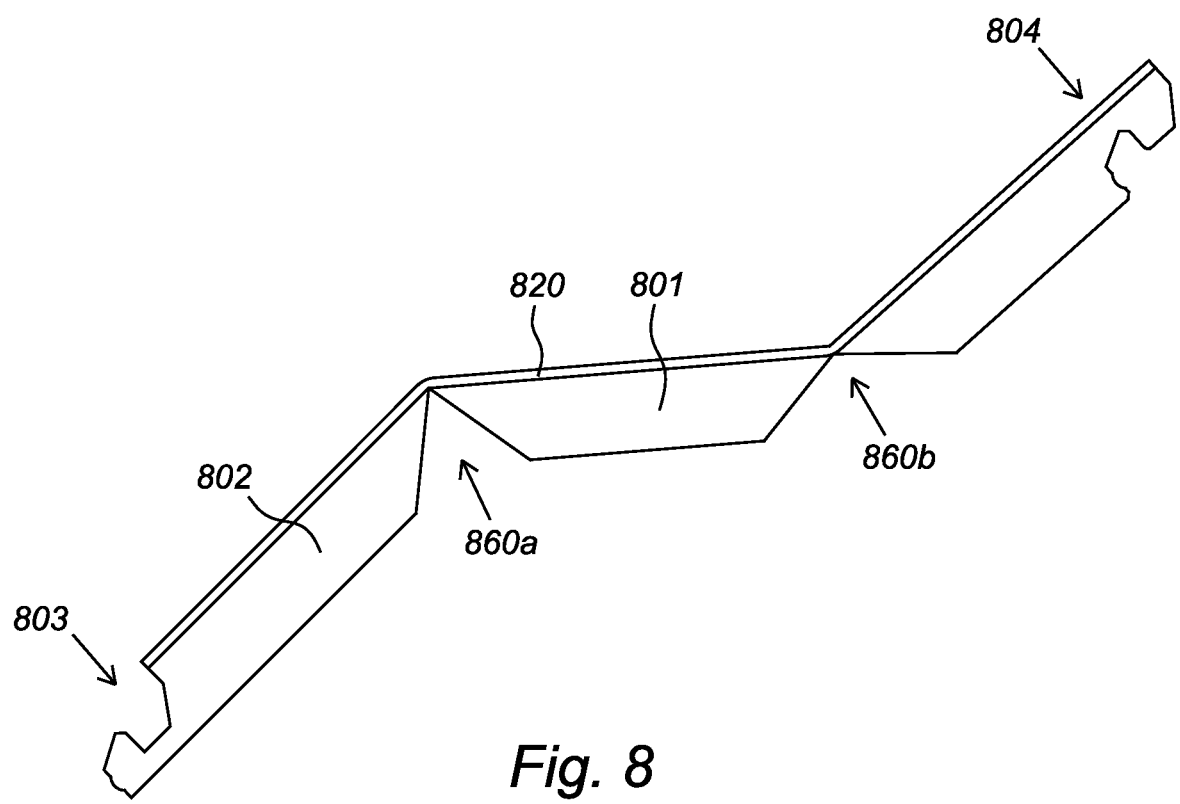
FIG. 8 a schematic representation of a fifth embodiment of a floor tile according to the invention.

FIG. 8 shows a schematic representation of a floor tile 801 comprising a plurality of grooves 860a, 860b. The floor tile 801 comprises a substantially rigid base layer 802 and an upper substrate layer 820. The grooves 860a, 860b are V-shaped grooves which are located in the base layer 802. The grooves facilitate bending and/or folding of the tile 801 at inside and outside corners of intersecting support surfaces of a tile (not shown). The grooves 860a, 860b can be positioned at any preferred location of the tile 801. The shape of the grooves 860a, 860b can be of any preferred design, however the depth of the grooves 860a, 860b should not extend past the upper surface of the rigid base layer 802. In the shown embodiment the floor tile 801 comprises a first coupling part 803 and a second coupling part 804, which are equal to the coupling parts shown in FIG. 1.

Although the figures disclose various embodiments according to the invention, the features of the embodiments may be combined where appropriate, all falling within the intended scope of the invention. One could for instance imaging the use of various coupling parts in the tile systems or interchange the coupling parts between the different embodiments. One could also image to omit the application of a substantially rigid base layer at least partially made of a closed cell foam plastic material; instead, another type of, preferably rigid, base layer could be used in each tile, which alternative base layer may be made, for example, of at least one material selected from the group consisting of: MDF, HDF, synthetic material, such as a thermoplastic like polyvinyl chloride (PVC), a composite material, in particular a dust-(thermo)plastic-composite, a non-foamed plastic material, a mineral material and/or a thermoplastic material which is enriched with one or more additives. Here, the expression "dust" is understood is small dust-like particles (powder), like wood dust, cork dust, or non-wood dust, like mineral dust, stone powder, in particular cement. By combining bamboo dust, wood dust, or cork dust, or combination thereof, with for example high density polyethylene (HDPE), or polyvinylchloride (virgin, recycled, or a mixture thereof), a rigid and inert core is provided that does not absorb moisture and does not expand or contract, resulting in peaks and gaps. Although tile commonly has a laminated structure (multi-layer structure), the tile according to the invention may also be formed by a single layer tile.

Hence, the above-described inventive concepts are illustrated by several illustrative embodiments. It is conceivable that individual inventive concepts may be applied without, in so doing, also applying other details of the described example. It is not necessary to elaborate on examples of all conceivable combinations of the above-described inventive concepts, as a person skilled in the art will understand numerous inventive concepts can be (re)combined in order to arrive at a specific application.

It will be apparent that the invention is not limited to the working examples shown and described herein, but that numerous variants are possible within the scope of the attached claims that will be obvious to a person skilled in the art.

The verb "comprise" and conjugations thereof used in this patent publication are understood to mean not only "comprise", but are also understood to mean the phrases "contain", "substantially consist of", "formed by" and conjugations thereof.

The invention claimed is:

1. A multi-purpose tile system, comprising a plurality of multi-purpose tiles, the tile system comprising first coupling parts and at least one second coupling parts, and each tile comprising:
  a substantially rigid base layer,
  at least one first coupling part and/or at least one second coupling part provided at different edges of the tile,
  which first coupling part comprises an upward tongue, at least one upward flank lying at a distance from the upward tongue and a single upward groove formed between the upward tongue and the upward flank, wherein:
  at least a part of a side of the upward tongue facing toward the upward flank is inclined toward the upward flank,
  at least an inclined flat or rounded surface of the upward tongue facing toward the upward flank forms a first upward aligning edge for the purpose of coupling the first coupling part to a second coupling part of an adjacent tile,
  at least a part of a side of the upward tongue facing away from the upward flank is provided with a first locking element which is adapted for co-action with a second locking element of a second coupling part of an adjacent tile,
  which second coupling part comprises a downward tongue, at least one downward flank lying at a distance from the downward tongue, and a single downward groove formed between the downward tongue and the downward flank, wherein:
  at least a part of a side of the downward tongue facing toward the downward flank is inclined toward the downward flank,
  at least an inclined flat or rounded surface of the downward tongue facing away from the downward flank forms a downward aligning edge for the purpose of coupling the second coupling part to a first coupling part of an adjacent tile, the downward flank is provided with a second locking element which is connected substantially rigidly to the downward flank and adapted for co-action with a first locking element of a first coupling part of an adjacent tile, said first and second locking elements being formed by a vertical flat portion and a bulge-recess combination in which the first locking element comprises a bulge and the vertical flat portion positioned above the bulge and the second locking element comprises a recess, wherein the first locking element is positioned at a distance from an upper side of the upward tongue, wherein the second locking element is positioned at a distance from an upper side of the downward groove, wherein the vertical flat portion, the bulge, and the recess are configured to be in contact with one another when the tile and the adjacent tile are in a locked position such that no gap exists between the vertical flat portion, the bulge, and the recess;

wherein the upward groove is adapted to receive at least a part of a downward tongue of an adjacent tile, and wherein the downward groove is adapted to receive at least a part of an upward tongue of an adjacent tile, wherein the substantially rigid base layer is at least partially made of a composite comprising a closed cell foam plastic material and at least one filler, provided with a toughening agent, wherein the plastic material of the closed cell foam plastic material of the base layer is free of plasticizer, wherein the base layer contains 3% to 9% by weight of said toughening agent, wherein at least one filler is selected from the group consisting of: talc, chalk, wood, calcium carbonate, titanium dioxide, calcined clay, porcelain, a mineral filler, and a natural filler, and wherein the weight content of filler in the foamed composite of the base layer is between 40 and 48%.

2. The tile system as claimed in claim 1, wherein the substantially rigid base layer is at least partially made of a closed cell foam PVC material.

3. The tile system as claimed in claim 1, wherein the base layer of foam plastic material has a density in the range of about 0.1 to 1.5 g/cm³.

4. The tile system as claimed in claim 1, wherein, each tile comprises an upper substrate affixed to an upper side of the base layer, wherein said substrate comprises a decorative layer.

5. The tile system as claimed in claim 4, wherein the upper substrate is at least partially made of at least one material selected from the group consisting of: metals, alloys, macromolecular materials such as vinyl monomer copolymers and/or homopolymers; condensation polymers such as polyesters, polyamides, polyimides, epoxy resins, phenol-formaldehyde resins, urea formaldehyde resins; natural macromolecular materials or modified derivatives thereof such as plant fibres, animal fibres, mineral fibres, ceramic fibres and carbon fibres.

6. The tile system as claimed in in claim 5, wherein the vinyl monomer copolymers and/or homo-polymers are selected from the group consisting of polyethylene, polyvinyl chloride, polystyrene, polymethacrylates, polyacrylates, polyacrylamides, ABS, (acrylonitrile-butadiene-styrene) copolymers, polypropylene, ethylene-propylene copolymers, polyvinylidene chloride, polytetrafluoroethylene, polyvinylidene fluoride, hexafluoropropene, and styrene-maleic anhydride copolymers.

7. The tile system as claimed in claim 4, wherein the upper substrate comprises the decorative layer and an abrasion resistant wear layer covering said decorative layer, wherein a top surface of said wear layer is the top surface of said tile, and wherein the wear layer is a transparent material, such that decorative layer is visible through the transparent wear layer.

8. The tile system as claimed in claim 1, wherein the closed cell foam plastic material of the base layer has an elastic modulus of more than 700 MPa.

9. The tile system as claimed in claim 1, wherein a top section and/or a bottom section of the base layer forms a crust layer having a porosity which is less than the porosity of the closed cell foam plastic material of the base layer, wherein the thickness of each crust layer is between 0.01 and 1 mm.

10. The tile system as claimed in claim 1, wherein each tile comprises at least one backing layer affixed to a bottom side of the base layer, wherein said at least one backing layer at least partially made of a flexible material.

11. The tile system as claimed in claim 10, wherein the base layer is composed of a plurality of separate base layer segments affixed to said at least one backing layer.

12. The tile system as claimed in claim 1, wherein each tile comprises at least one reinforcing layer, wherein the density of the reinforcing layer is situated between 1000 and 2000 kg/m3.

13. The tile system as claimed in claim 1, wherein at least a part of the first coupling part and/or at least a part of second coupling part of each tile is integrally connected to the base layer.

14. The tile system as claimed in claim 1, wherein the first coupling part and/or the second coupling part allows deformation during coupling and uncoupling.

15. The tile system as claimed in claim 1, wherein at least one coupling part of the first coupling part and second coupling part comprises a bridge connecting the tongue of said coupling part to the base layer, wherein the minimum thickness of the bridge is smaller than the minimum width of the tongue.

16. The tile system as claimed in claim 1, wherein the second coupling part comprises an upper bridge connecting the downward tongue to the base layer, wherein the upper bridge is configured to deform during coupling of adjacent panels, to widen the downward groove, and wherein a lower side of the upper bridge of the second coupling part is at least partially inclined.

17. The tile system according to claim 16, wherein the upper side of the upward tongue is at least partially inclined, wherein the inclination of the upper side of the upward tongue and the inclination of the bridge part of the second coupling part are substantially similar, wherein both inclinations for instance mutually enclose an angle between 0 and 5 degrees.

18. The tile system as claimed in claim 1, wherein at least a part of the upward flank adjoining the upper side of the tile is adapted to make contact with at least a part of the downward tongue adjoining the upper side of another tile in a coupled state of these tiles.

19. The tile system as claimed in claim 18, wherein the upper side of the tile is adapted to engage substantially seamlessly to the upper side of another tile.

20. The tile system as claimed in claim 1, wherein a mutual angle enclosed by at least an inclined part of a side of the upward tongue facing toward the upward flank and the upward flank is substantially equal to the mutual angle enclosed by at least an inclined part of a side of the downward tongue facing toward the downward flank and the downward flank.

21. The tile system as claimed in claim 1, wherein the angle enclosed by on the one hand the direction in which at least a part of a side of the upward tongue facing toward the upward flank extends and on the other the normal of the upper side of the base layer lies between 0 and 60 degrees.

22. The tile system as claimed in claim 1, wherein the angle enclosed by on the one hand the direction in which at least a part of a side of the downward tongue facing toward the downward flank extends and on the other the normal of the lower side of the base layer lies between 0 and 60 degrees.

23. The tile system as claimed in claim 1, wherein the first locking element comprises at least one outward bulge, and that the second locking element comprises at least one recess, which outward bulge is adapted to be at least partially received in a recess of an adjacent coupled tile for the purpose of realizing a locked coupling.

24. The tile system as claimed in claim 1, wherein a side of the downward tongue facing away from the downward flank is provided with a third locking element, and wherein the upward flank is provided with a fourth locking element, said third locking element being adapted to cooperate with a fourth locking element of another tile.

25. The tile system as claimed in claim 24, wherein the shortest distance between an upper edge of the downward tongue and a lower side of the base layer defines a plane, wherein the third locking element and at least a part of the downward tongue are situated at opposite sides of said plane.

26. The tile system as claimed in claim 24, wherein the minimum distance between said third locking element and an upper side of the tile is smaller than the minimum distance between an upper side of the upward tongue and said upper side of the tile.

27. The tile system as claimed in claim 1, wherein a side of the upward tongue facing away from the upward flank is positioned at a distance from the downward flank, in coupled condition of adjacent tiles.

28. The tile system as claimed in claim 1, wherein the first coupling part and the second coupling part are configured to co-act in such a manner that coupled tiles are substantially locked both in a direction parallel to the plane defined by the tiles as well as in a direction perpendicular to said plane defined by the tiles.

\* \* \* \* \*